United States Patent

[11] 3,590,326

| [72] | Inventor | John D. Watson |
| | | Portsmouth, England |
| [21] | Appl. No. | 47,624 |
| [22] | Filed | June 18, 1970 |
| [45] | Patented | June 29, 1971 |
| [73] | Assignee | Westinghouse Electric Corporation |
| | | Pittsburgh, Pa. |
| | | Continuation of application Ser. No. 765,582, Oct. 7, 1968, now abandoned. |

[54] OVERCURRENT PROTECTIVE DEVICE
20 Claims, 4 Drawing Figs.

[52] U.S. Cl. .................................................. 317/36, 317/142, 320/1
[51] Int. Cl. .................................................. H01h 45/18
[50] Field of Search .................................. 320/1; 317/36, 142

[56] References Cited
UNITED STATES PATENTS

| Re. 25,762 | 4/1965 | Kotheimer | 317/36 |
| 3,262,017 | 7/1966 | Ashenden et al. | 317/36 X |
| 3,329,870 | 7/1967 | Viney et al. | 317/36 |
| 3,419,757 | 12/1968 | Steen | 317/36 |

Primary Examiner—James D. Trammell
Attorneys—A. T. Stratton and C. L. McHale

ABSTRACT: An overcurrent protective device of the time delay type is provided which is responsive to the current in an alternating current circuit which is being protected. When the instantaneous current exceeds a predetermined value as sensed by a level detecting means, the protective device produces an output after a predetermined time delay which may be of a fixed duration or which may vary inversely with the magnitude of the current being sensed. If the instantaneous current decreases below the predetermined value before the end of the predetermined time delay and remains below the predetermined value, the level detecting means after a relatively short time period or interval actuates or resets the protective device to an operating condition which corresponds to the beginning of whatever predetermined time delay is provided in the operation of the overall protective device.

INVENTOR
John D. Watson

OVERCURRENT PROTECTIVE DEVICE

This application is a continuation of application Ser. No. 765,582, filed Oct. 7, 1968 now abandoned.

Cross References to Related Applications

Certain features of the protective device disclosed in the present application are disclosed and claimed in copending application Ser. No. 765,583, filed Oct. 7, 1968 by J. D. Watson, copending application Ser. No. 765,584, filed Oct. 7, 1968 by J. D. Watson, F. O. Johnson and F. T. Thompson and copending application Ser. No. 765,552, filed Oct. 7, 1968 by W. H. South and J. H. Taylor which are all assigned to the same assignee as the present application.

Background of the Invention

This invention relates to overcurrent protective relay devices of the time delay type and more particularly to means for detecting the level of an overcurrent in an electrical circuit which is being protected.

In the past, overcurrent protective devices, particularly those of the static type, have provided means for rectifying and filtering an alternating signal which is derived from the alternating current in the circuit being protected to obtain a filtered, unidirectional output signal which is then applied to a level detecting circuit or means which responds to a threshold value of unidirectional signal to actuate the start of whatever predetermined time delay is provided in the operation of the protective relay device. If the instantaneous alternating current in the circuit being protected decreases to a level lower than that which corresponds to the threshold value of the level detecting circuit after a time delay is started but before the end of the predetermined time delay provided, it is desirable that the level detecting circuit reset the operating condition of the overall protective device to the beginning of the time delay provided within a relatively short time. Where a filtered, unidirectional signal is applied to the input of the level detecting circuit, the reset of the protective device may be slowed down depending upon the degree of filtering provided or the output of the level detecting circuit may be chopped in form. It is therefore desirable to provide an improved leveled detecting circuit of the type described which will overcome the disadvantages of known level detecting circuits of the type described as well as provide other advantages.

Summary of the Invention

In accordance with the invention, an overcurrent protective relay of the time delay type is provided in which an unfiltered, unidirectional output signal is derived from the alternating current in the circuit being protected and is applied to the input of a level detecting means which provides an output to actuate the start of a predetermined time delay provided in the operation of the overall protective device when the instantaneous current in the circuit being protected increases above a threshold value. If the instantaneous current should exceed the threshold value to start the predetermined time delay and then decrease below the threshold value before the end of the predetermined time delay the level detecting means includes a timing circuit which delays the resetting of the protective device by the level detecting means to the beginning of the predetermined time delay for a predetermined time interval which may be slightly longer than one half cycle of the alternating current in the circuit which is being protected.

It is therefore an object of this invention to provide an improved overcurrent protective relay device of the time delay type including a level detecting circuit which responds substantially instantaneously to a predetermined level of alternating current in a circuit being protected to provide an effective output and which relatively rapidly resets the protective device when the instantaneous current level decreases below the predetermined value after a predetermined time interval.

Brief Description of the Drawings

Other objects of the invention will be apparent from the following detailed description taken in conjunction with the accompanying drawings in which.

Description of the Preferred Embodiments

Figure 1:
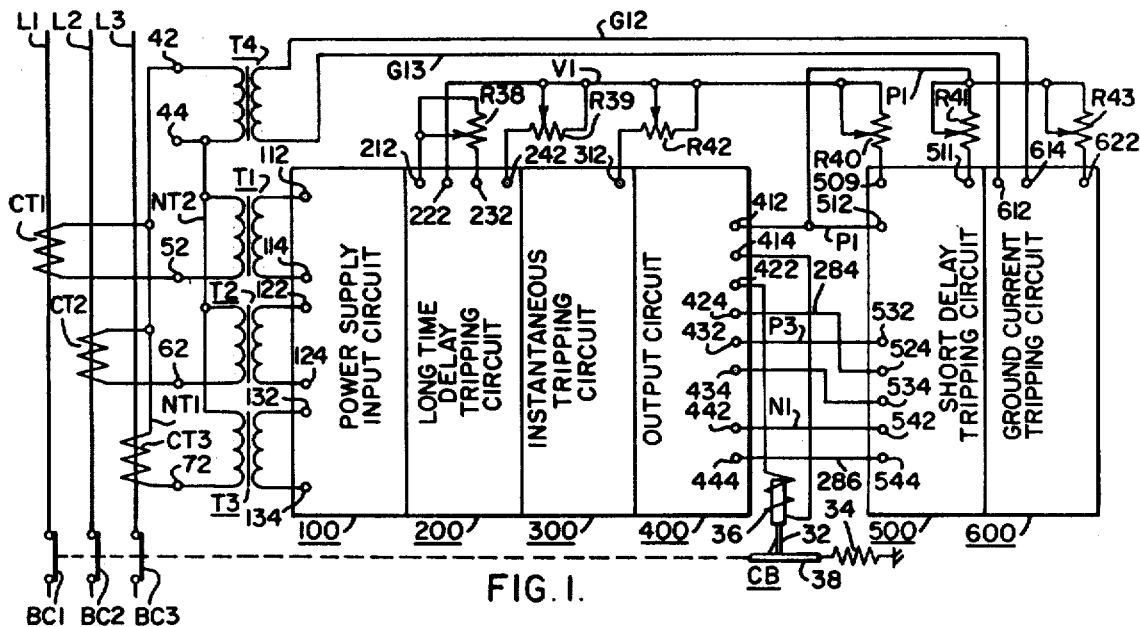
FIG. 1 is a schematic diagram, partly in block form, of an overcurrent protective relay device of the time delay type embodying the invention and associated with an electrical system or circuit.

Referring now to the drawings and FIG. 1 in particular, there is illustrated an overcurrent protective relay device associated with the line conductors L1, L2 and L3 of an electrical power system or circuit to be protected. The electrical system may be of any desired type such as a single-phase system or a polyphase system. It will be assumed for purposes of the present description that the electrical system is a three-phase alternating current system represented by the line conductors L1, L2 and L3 and designed for operation at a frequency of 60 cycles per second.

A circuit breaker CB is provided for segregating or isolating portions of the electrical system under certain abnormal or fault conditions, such as an overcurrent condition. The circuit breaker CB includes a plurality of separable line contacts BC1, BC2 and BC3 which are closed when the circuit breaker is closed and which are opened when the circuit breaker is opened. The circuit breaker CB also includes a trip coil 36 which when energized while the circuit breaker is closed results in a tripping or opening operation of the circuit breaker CB. As illustrated diagrammatically in FIG. 1, energization of the trip coil 36 may actuate an operating member 32 to release a latch member 38 to thereby actuate an opening operation of the line contacts BC1, BC2 and BC3 under the influence of a suitable operating means, such as the spring 34, which may be operatively connected to said line contacts.

In general, the protective device shown in FIG. 1 is arranged to respond to the highest of the line currents which flow in the conductors L1, L2 and L3 to energize the trip coil 36 and to actuate the tripping of the circuit breaker CB after a time delay which is initiated when the highest of the line currents in the conductors L1, L2 and L3 exceeds a predetermined value and which varies substantially inversely with the square of the highest of the line currents in said conductors for a predetermined range of overcurrents in said conductors. Where desired, the protective device shown in FIG. 1 may also respond to the highest of the line currents in the line conductors L1, L2 and L3 to energize the trip coil 36 and to actuate the tripping of the circuit breaker CB in a substantially instantaneous manner without any intentional time delay when the highest of the line currents in said conductors exceeds a predetermined value or to energize the trip coil 36 and to actuate the tripping of the circuit breaker CB after a substantially fixed or predetermined time delay when the highest of the line currents in said conductors exceeds a predetermined value. In addition, where required, the protective device shown in FIG. 1 may respond to a predetermined ground current in the electrical system which includes the line conductors L1, L2 and L3 to energize the trip coil 36 and to actuate the tripping of the circuit breaker CB after a substantially fixed or predetermined time delay when the ground current exceeds a predetermined value which initiates the start of the substantially fixed or predetermined time delay.

In order to obtain a plurality of output currents which are directly proportional to the line currents in the line conductors L1, L2 and L3, a plurality of current transformers or sensors CT1, CT2 and CT3 are provided as shown in FIG. 1 with the primary windings of said current transformers being energized in accordance with the line currents in the line conductors L1, L2 and L3 respectively. The secondary windings of the current transformers CT1, CT2, CT3 are wye connected between the neutral terminal or conductor NT1 and the respective output terminal 52, 62 and 72. In order to further step down the output currents of the current transformer CT1, CT2 and CT3, the intermediate transformers T1, T2 and T3 which may be of the saturating type are connected between the secondary windings of said current transformers and the input terminals of the power supply input circuit 100 of the protective device shown in FIG. 1. More specifically, the primary windings of the transformers T1, T2 and T3 are wye connected between the output terminals 52, 62 and 72, respectively, of the current transformers CT1, CT2 and CT3 respectively, and the neutral terminal NT2 with the neutral terminal NT2 being connected to the neutral terminal NT1 of said current transformers through the primary winding of a ground current transformer T4 where ground current tripping protection is desired. Where ground current tripping protection is not required, the neutral terminal NT2 at the terminal 44 of the primary winding of the ground current transformer T4 may be directly connected to the neutral terminal NT1 of the current transformers CT1, CT2 and CT3. The secondary windings of the intermediate transformers T1, T2 and T3 are connected to the input terminals 112 and 114, 122 and 124, and 132 and 134, respectively, of the power supply input circuit 100 of the protective device shown in FIG. 1 to provide three output currents which, in turn, are directly proportional to the line currents in the line conductors L1, L2 and L3 of the electrical system, as illustrated.

Figure 2:
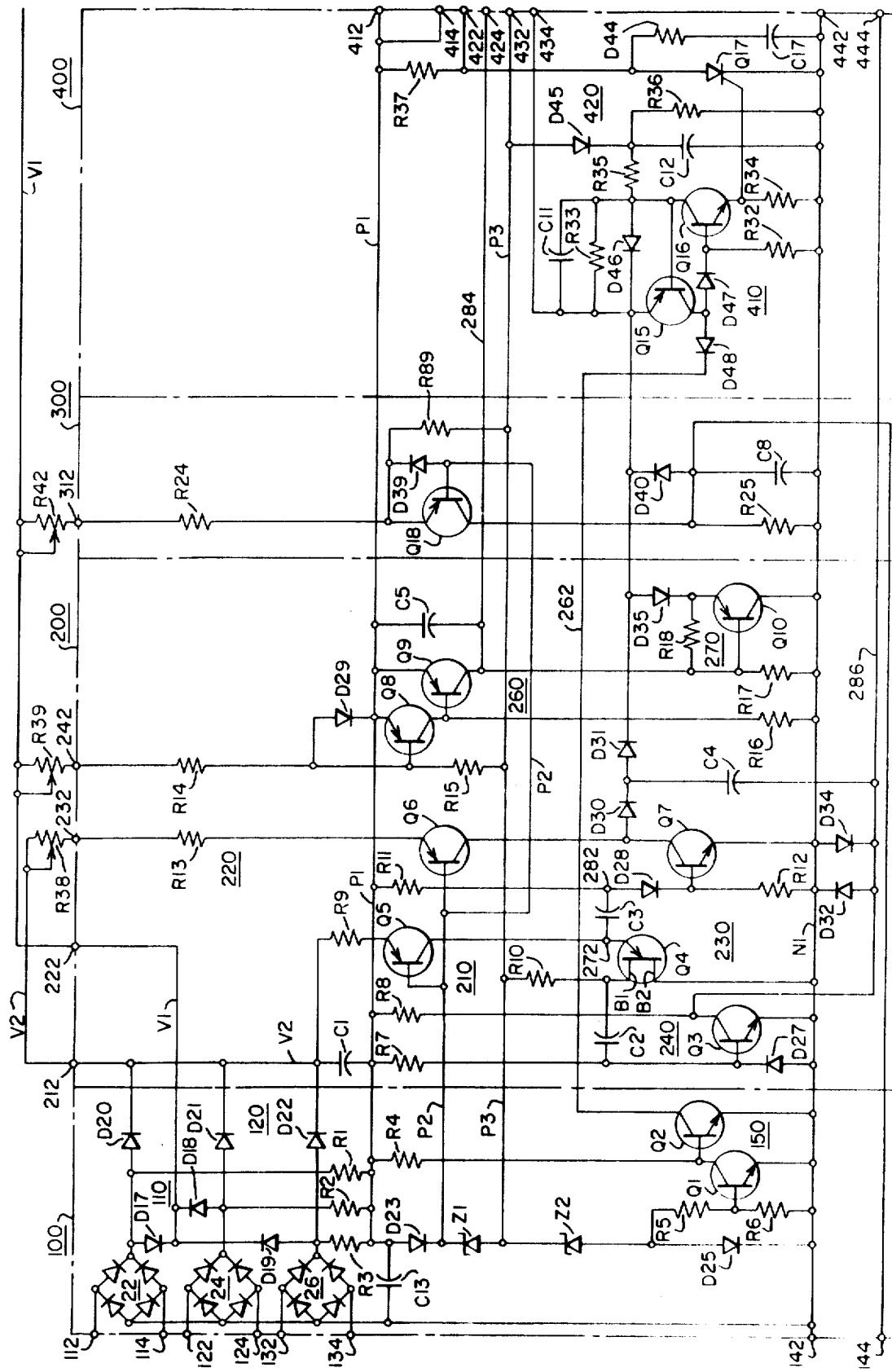
FIG. 2 is a detailed schematic diagram of a portion of the protective device which is shown in block form in FIG. 1.

In order to rectify the alternating current outputs of the transformers T1, T2 and T3, the power supply input circuit 100 of the protective device shown in FIG. 1 includes a plurality of full wave rectifiers 22, 24 and 26, respectively as illustrated in FIG. 2 of the drawings. As shown in FIG. 2, the input terminals of the full wave rectifier 22 are connected to the terminals 112 and 114 which, in turn, are connected across the secondary winding of the transformer T1. Similarly, the input terminals of the full wave rectifiers 24 and 26 at the terminals 122 and 124 and 132 and 134, respectively, are connected across the secondary windings of the transformers T2 and T3, respectively.

Power Supply Input Circuit 100

In order to develop a plurality of unidirectional voltages which correspond to and are directly proportional to the line currents in the conductors L1, L2 and L3, the power supply input circuit 100 of the protective device includes a plurality of resistors R1, R2 and R3 whose upper ends are connected to the positive output terminals of the full wave rectifiers 22, 24 and 26, respectively. The lower ends of the resistors R1, R2 and R3 are electrically connected together at the conductor P1. One or more filter capacitors, as indicated at C13 in FIG. 2, is connected between the conductor P1 and the negative output terminals of the full wave rectifiers 22, 24, 26 which are electrically connected together to a common terminal, as indicated at the conductor N1. In order to provide a plurality of regulated, filtered unidirectional voltages for the balance of the protective device shown in FIGS. 1 and 2, a series circuit is connected electrically in parallel with the capacitor C13 between the conductor P1 and the common conductor N1 which includes the forward connected diode D23, a first reversely poled Zener diode Z1, a second reversely poled Zener diode Z2 and a forward connected diode D25.

When the power supply input circuit 100, is initially energized from the current transformers CT1, CT2 and CT3 and the associated transformers T1, T2, T3, the three output currents from the full wave rectifiers 22, 24 and 26 flow through the resistors R1, R2 and R3, respectively, to develop three separate unidirectional voltages which are directly proportional to the line currents in the conductors L1, L2 and L3, respectively and to charge the capacitor C13. The voltages across the capacitor C13 increases as the capacitor is charged from the full wave rectifiers 22, 24 and 26 until the voltage across the capacitor C13 is sufficient to cause the Zener diodes Z1 and Z2 to break down and limit the voltage across the capacitor C13 to substantially a predetermined value which is equal to the total of the forward voltage drops across the diodes D23 and D25 and the reverse breakdown voltages across the Zener diodes Z1 and Z2. The regulated and filtered voltage across the capacitor C13 which is available between the conductors P1 and N1 may, for example, be of the order of 33 volts while the voltage available between the conductor P2 and the common conductor N1 will be less than the voltage between the conductors P1 and N1 by the forward voltage drop across one or more diodes, as indicated by the diode D23. Similarly, the regulated voltage available between the conductor P3 and the common conductor N1 will be less than the voltage between the conductors P1 and N1 by the forward voltage drop across the diode D23 and the reverse breakdown voltage across the Zener diode Z1. It is to be noted that after the Zener diodes Z1 and Z2 break down during the initial charging of the capacitor C13, the three unidirectional output currents from the full wave rectifiers 22, 24 and 26 will flow from the positive terminals of said rectifiers through the respective resistors R1, R2 and R3 to the conductor P1 and then through the series circuit which includes the diode D23, the Zener diodes Z1 and Z2 and the diode 25 to the common conductor N1 which is connected to the negative output terminals of the rectifiers 22, 24 and 26.

In order to obtain a first unidirectional voltage which varies only with the highest of the three unidirectional voltages across the resistors R1, R2, R3 and, in turn, only with the highest of the line currents in the conductors L1, L2 and L3, the power supply input circuit 100 includes a first auctioneering circuit 110 which comprises the diodes D17, D18 and D19. The diodes D17, D18 and D19 are forward connected between the upper ends of the resistors R1, R2 and R3, respectively, at the positive output terminals of the rectifiers 22, 24 and 26, respectively, and a common variable voltage output conductor or bus V1, as shown in FIG. 2. The unidirectional output voltage of the first auctioneering circuit 110 which is available or appears between the conductor V1 and the conductor P1 will be equal to the highest voltage across resistors R1, R2 and R3 less the forward voltage drop across one of the diodes D17, D18 and D19 since if the unidirectional voltage across one of said resistors exceeds the unidirectional voltages across the other two of said resistors, two of the three diodes D17, D18 and D19 will be blocked or reversed biased by the highest unidirectional voltage which is present between the conductors V1 and P1. It is important to note that the unidirectional output voltage which appears between the conductors V1 and P1 is unfiltered for reasons which will be explained hereinafter.

In order to obtain a second unidirectional output voltage which varies only with the highest of the three unidirectional voltages across the resistors R1, R2 and R3 and, in turn with only the highest of the line currents in the conductors L1, L2 and L3, the power supply input circuit 100 includes a second auctioneering circuit 120 which includes the diodes D20, D21 and D22. Similarly to the diodes of the first auctioneering circuit 100, the diodes D20, D21 and D22 are connected to the upper ends of the resistors R1, R2 and R3, respectively, at the positive output terminals of the rectifiers 22, 24 and 26, respectively, and a common variable voltage output conductor V2 which forms part of the long time delay tripping circuit 200, as shown in FIG. 2. The unidirectional output voltage of the second auctioneering circuit 120 is available between the conductors V2 and the conductor P1 and is equal to the highest of the three unidirectional output voltages across the resistors R1, R2 and R3 less the forward voltage drop across one of the diodes D20, D21 and D22. The unidirectional output voltage of the second auctioneering circuit 120 is filtered by the capacitor C1 which is connected between the conductor V2 and the conductor P1. The second auctioneering circuit 120 operates similarly to the first auctioneering circuit 110 in that when one of the three unidirectional voltages across the resistors R1, R2, R3 exceeds the other two unidirectional voltages, two of the forward connected diodes D20, D21 and D22 will be blocked or reversed biased.

In order to prevent the operation of the protective device shown in FIG. 1, prior to the time that the capacitor C13, which may include one or more energy storing capacitors in a particular application, is fully charged or in the event that the capacitor C13 should not be fully charged during the operation of the protective device shown in FIG. 1, the power supply input circuit 100 includes the control means or circuit 150 which comprises the NPN transistors Q1 and Q2, as shown in FIG. 2. In general, the control means 150 of the power supply input circuit 100 is provided to insure that the capacitor C13 has acquired sufficient charge or stored energy to adequately energize the trip coil 36 of the circuit breaker CB when called upon to do so during the operation of the protective device shown in FIG. 1, as will be explained in greater detail hereinafter. More specifically, the control means 150 of the power supply input circuit 100 includes a voltage dividing network which comprises the resistors R5 and R6 connected in series with one another, the series circuit being electrically connected in parallel with the diode D25 between the anode of the diode D25 and the common or negative conductor N1. When the capacitor C13 is fully charged and the Zener diodes Z1 and Z2 break down, the diode D25 limits the voltage across the series circuit which includes the resistors R5 and R6 to the forward voltage drop of the diode D25. In order to apply a drive current to the base of the transistor Q1 when the capacitor C13 is fully or adequately charged, the base of the transistor Q1 is connected to the junction point between the resistors R5 and R6, while the emitter of the transistor Q1 is connected to the common conductor N1. The collector of the transistor T1 is connected to the conductor P1 through a collector load resistor R4 and is also directly connected or coupled to the base of the transistor Q2. The emitter of the transistor Q2 is also directly connected to the common conductor N1, while the collector of the transistor Q2 is connected to the collector of the transistor Q15 which forms part of the output circuit 400, as shown in FIG. 2, through a conductor 262 and a diode D48 which is a normally block or reversed biased, isolating diode, whose purpose will be explained in more detail hereinafter.

In the operation of the control means 150, prior to the time that the charge on the capacitor C13 and the corresponding voltage thereacross is sufficient to break down the Zener diodes Z1 and Z2 in the reverse direction or whenever the charge on the capacitor C13 and the corresponding voltage thereacross is insufficient to break down said Zener diodes during the operation of the overall protective device shown in FIG. 1, the current flowing in the base-emitter circuit of the transistor Q1 will be insufficient to actuate the transistor Q1 to a saturated condition and the transistor Q1 will therefore be substantially nonconducting or cutoff. Whenever the transistor Q1 is substantially nonconducting or cutoff and a unidirectional output voltage is present at the conductor P1, current will flow from the conductor P1 to the conductor N1 through the resistor R4 and the base-emitter circuit of the transistor Q2 to actuate the transistor Q2 to a saturated condition in which the voltage drop across the collector-emitter circuit of the transistor Q2 will be relatively negligible and the voltage or potential at the conductor 262 will be very close to the potential at the common conductor N1. Whenever the potential at the conductor 262 is held at a value which is very close to the potential at the common conductor N1, the diode D48 in the output circuit 400 of the protective device will be unblocked or forward biased to thereby prevent the operation of the output circuit 400 of the protective device shown in FIG. 1, as will be explained in detail hereinafter.

In the operation of the control means 150, after the capacitor C13 is fully or adequately charged sufficiently to break down the Zener diodes Z1 and Z2 or whenever the charge on the capacitor C13 and the corresponding voltage thereacross is sufficient to break down said Zener diodes in the reverse direction, current will flow through the series circuit which includes the diode D23, the Zener diodes Z1 and Z2, the resistor R5, and the base-emitter of the transistor Q1 which is sufficient to actuate the transistor Q1 to a saturated condition in which the current flowing in the collector-emitter circuit of the transistor Q1 is limited only by value of the resistor R4 which is connected in series with the collector of the transistor Q1 and the voltage between the conductor P1 and the conductor N1. When the transistor Q1 is actuated to a saturated condition as just described, the potential at the base of the transistor Q2 will change to a potential which is very close to the potential at the common conductor N1 and the current flow in the base-emitter circuit of the transistor Q2 will be reduced to a value less than that necessary to maintain the transistor Q2 in a saturated condition and the transistor Q2 will therefore be actuated to a substantially nonconducting or cutoff condition. When the transistor Q2 is actuated to a substantially nonconducting or cutoff condition, the potential at the conductor 262 with respect to the potential at the conductor N1 will be raised sufficiently to block or reverse bias the diode D48 and the output circuit 400 of the protected device shown in FIG. 1 will be permitted to operate in normal fashion, since the capacitor C13 will be assured a sufficient charge and corresponding voltage thereacross to energize the trip coil 36 of the circuit breaker CB when called upon to do so during the operation of the protective device as shown in FIG. 1. It is to be noted that the value of the resistor R6 which forms part of the control means 150 may be selected so as to determine the minimum current in the base-emitter circuit of the transistor Q1 which is necessary to actuate the transistor Q1 from a substantially nonconducting or cutoff condition to a saturated condition to thereby decrease the sensitivity of the control means 150, as desired, in a particular application.

Long Time Delay Tripping Circuit 200

In general, the long time delay tripping circuit 200 is connected between the power supply input circuit 100 and the output or level detecting circuit 400 of the protective device shown in FIG. 1 to respond to the highest of the unidirectional voltages developed across the resistors R1, R2 and R3 which appear at the conductors V1 and V2 to actuate the output circuit 400 to energize the trip coil 36 of the circuit breaker CB and trip said circuit breaker open whenever the highest of the line currents flowing in the line conductors L1, L2 and L3 exceeds a predetermined value after a time delay which varies substantially inversely with the square of the overcurrent over a predetermined range of overcurrents and which is initiated when the highest of the line currents in said conductors exceeds the predetermined or threshold value. More specifically, the long time delay tripping circuit 200 includes the first and second substantially constant current sources or circuits 210 and 220 respectively, which are connected to the variable voltage output conductor V2 of the second auctioneering circuit 120 for converting the highest of the unidirectional voltages across the resistors R1, R2 and R3 to first and second substantially predetermined unidirectional output currents which are maintained at substantially constant values for a particular value of the highest unidirectional voltage across said resistors independently of changes in the loads connected at the outputs of said current circuits. The unidirectional output currents of the current circuits 210 and 220 which vary in a substantially linear manner with and are directly proportional to the highest of the unidirectional voltages across the resistors R1, R2 and R3 and, in turn, vary in a substantially linear manner and are directly proportional to the highest of the line currents in the conductors L1, L2 and L3 are then applied to a pulse generating circuit 230 for producing output pulses of unidirectional current whose frequency of repetition rate and magnitude or amplitude both vary in a substantially linear manner with the highest of the line currents in the conductors L1, L2 and L3, with each of said pulses having a substantially predetermined width or duration. The output pulses of unidirectional current from the pulse generating circuit 230 are applied to a timing capacitor or integrating capacitor C4 to cumulatively charge the capacitor C4 when permitted to do so by a level detecting circuit 260 which is connected to the variable voltage conductor V1 to permit the charging of the capacitor C4 when the highest of the line currents in the conductors L1, L2 and L3 increases to substantially a predetermined or threshold overcurrent value. When the pulse generating circuit 230 is permitted to charge the capacitor C4 cumulatively as permitted by the operation of the level detecting circuit 260, the charge across the capacitor C4 increases gradually to a predetermined or threshold value after a time delay which varies substantially inversely with the square of the highest line current in the conductors L1, L2 and L3 to actuate the operation of the output circuit 400 of the protective device shown in FIG. 1 to energize the trip coil 36 of the circuit breaker CB. In order to periodically increase the effective voltage across the timing capacitor C4 for reasons which will be explained hereinafter, the long time delay tripping circuit 200 also includes an auxiliary pulse generating circuit 240 which is responsive to the output pulses of the pulse generating circuit 230 to periodically increase the effective charge and corresponding voltage across the timing or integrating capacitor C4.

More specifically, the first current circuit means 210 is connected to the second auctioneering circuit 120 for converting the highest unidirectional voltage across the resistors R1, R2 and R3 to a first unidirectional output current which is maintained at substantially a predetermined or constant value for a particular value of the highest unidirectional voltage across said resistors and which varies in a substantially linear manner with the highest unidirectional voltage across said resistors. The first current circuit means 210 comprises a PNP transistor Q5 and the resistor R9 which is electrically connected in series with the emitter of the transistor Q5 between the variable voltage conductor V2 at the upper end of the capacitor C1 and the emitter of the transistor T5. The base of the transistor Q5 is connected to the conductor P2 in order that the input voltage of the first circuit means 210 between the conductors V2 and P2 include the forward voltage drop of the diode D23 which may include one or more forward connected diodes in a particular application to thereby compensate the input voltage of the first circuit means 210 for the forward voltage drop across one of the diodes D20, D21 and D22 which is connected between one of the resistors R1, R2 and R3 having the highest unidirectional voltage thereacross and the variable conductor V2 and the forward voltage drop across the base-emitter circuit of the transistor Q5. The emitter current of the transistor Q5 is therefore equal to the ratio of the highest unidirectional voltage across one of the resistors R1, R2 and R3 to the value of the resistor R9 which is connected in series with the emitter of the transistor Q5. The unidirectional output current of the first circuit means 210 is available at the collector of the transistor Q5 which is connected to the left side of the capacitor C3 at the terminal 272. In order to maintain the unidirectional output current of the first circuit means 210 at substantially a predetermined or constant value for a particular value of the highest unidirectional voltage across the resistors R1, R2 and R3, the input voltage applied across the series circuit which includes the resistor R9 and the emitter-base circuit of the transistor Q5 should be relatively high, such as the order of 10 to 20 times the forward voltage drop across the emitter-base circuit of the transistor Q5. In addition, the transistor Q5 should have a relatively high current gain or ratio of emitter current to base current, such as of the order of 100, at the particular level of output current at which the transistor Q5 is operating in order that the base current of the transistor Q5 be negligible compared with the emitter current and the collector current of the transistor Q5 be substantially equal to the emitter current. In the operation of the first circuit means 210, the unidirectional output current at the collector of the transistor Q5 is maintained at a substantially predetermined or constant value for a particular value of the highest unidirectional voltage across the resistors R1, R2 and R3 independent of changes in whatever load circuit is connected to the collector of the transistor Q5 and the unidirectional output current at the collector of the transistor Q5 varies in a substantially linear manner with the highest unidirectional voltage across the resistors R1, R2 and R3 and, in turn, with the highest line current in the conductors L1, L2 and L3.

Similarly, the second current circuit means 220 is connected to the first auctioneering circuit 110 for converting the highest unidirectional voltage across the resistors R1, R2 and R3 to a second unidirectional output current which is maintained at substantially a predetermined or constant value for a particular value of the highest unidirectional voltage across said resistors independent of changes in whatever load circuit is connected to the output of the second current circuit means 220 and which varies in a substantially linear manner with the highest unidirectional voltage across said resistors. The second current circuit means 220 comprises the PNP transistor Q6, the resistor R13 which is connected in series with the emitter of the transistor Q6 and the rheostat or variable resistance means R38 which is connected in series with the resistor R13 and the emitter of the transistor 216 between the second variable voltage conductor V2 and the emitter of the transistor Q6. The base of the transistor Q6 is connected to the conductor P2 in order that the input voltage of the second circuit means 220 between the conductor V2 and the conductor P2 include the forward voltage drop across the diode D23 to thereby compensate the input voltage of the second circuit means 220 for the forward voltage drop across one of the diodes D20, D21 and D22 which is connected between one of the resistors R1, R2 and R3 having the highest unidirectional voltage thereacross and the variable voltage conductor V2 and the forward voltage drop across the emitter-base circuit of the transistor Q6. The emitter current of the transistor Q6 is substantially equal to the input voltage of the second circuit means 220 between the conductors V2 and P2 divided by the total resistance of the rheostat R38 and the resistor R13. Since the transistor Q6 is selected to have a relatively high current gain or ratio of emitter current to base current, such as of the order of 100, at the particular level of the emitter current at which the transistor Q6 is operating, the base current of the transistor Q6 is substantially negligible and the unidirectional output current of the transistor Q6 at the collector of the transistor Q6 is substantially equal to the emitter current of the transistor Q6. In order that the unidirectional output current of the second circuit means 220 at the collector of the transistor Q6 be maintained at substantially a predetermined constant value for a particular value of the highest unidirectional voltage across the resistors R1, R2 and R3, the input voltage applied to the second circuit means 20 between the conductor V2 and the conductor P2 should be relatively large compared with the forward voltage drop of the emitter-base circuit of the transistor Q6. The setting of the rheostat R38 may be adjusted to vary the unidirectional output current of the second circuit means 220 at the collector of the transistor Q6 which corresponds to a particular value of the highest unidirectional voltage across the resistors R1, R2 and R3 and, in turn, with the highest line current in the conductors L1, L2 and L3. It is to be noted that a portion of the input voltage applied to the second current circuit means 220 between the conductor V2 and the conductor P1, which is the same input voltage applied to the input of the first circuit means 210, if filtered by the capacitor C1. It is also to be noted that similar to the first current circuit means 210, the unidirectional output current of the second circuit means 220 which is available at the collector of the transistor Q6 also varies in a substantially linear manner with the highest unidirectional voltage across the resistors R1, R2 and R3 and, in turn, with the highest line current in the conductors L1, L2 and L3 respectively. The collector of the transistor Q6 of the second current circuit means 220 is connected to the upper side of the timing or integrating capacitor C4 through the diode D30 and cumulatively charges the timing capacitor C4 when permitted to do so by the operation of other portions of the overall protective device shown in FIG. 1 as explained hereinafter.

In order to control the application of the unidirectional output current from the second circuit means 220 to the timing capacitor C4 in the form of periodic pulses of current whose frequency and magnitude both vary in a substantially linear manner or are directly proportional to the highest line current in the conductors L1, L2 and L3 and whose width remains at a substantially predetermined duration when permitted to do so by the level detecting circuit 60 of the long time delay tripping circuit 200 as will be explained hereinafter, the pulse generating circuit 230 is connected to the first and second current circuit means 210 and 220, respectively, and to the positive conductors P1 and P3 which supply regulated and filtered unidirectional voltages to the pulse generating circuit 230 which is described in more detail in copending application Ser. No. 765,584 filed concurrently herewith by J. D. Watson, F. T. Thompson and F. O. Johnson which is assigned to the same assignee as the present application.

More specifically, the pulse generating circuit 230 comprises a breakover device, such as the unijunction transistor or double base diode Q4, the NPN transistor Q7 and the energy storing capacitor C3.

It is to be noted that the unidirectional, regulated potential at the conductor P1 may, for example, be approximately 33 volts which is positive with respect to the potential at the common or negative conductor N1, while the unidirectional regulated potential at the conductor P3 may be approximately one-half the voltage at the conductor P1 or may be, for example, at a voltage of approximately 16.5 volts which is positive with respect to the potential at the common conductor N1. The lower base of the unijunction transistor Q4 is connected directly to the common conductor N1 while the upper base of the transistor Q4 is connected to the conductor P3 through the resistor R10 to apply a substantially predetermined interbase potential to the transistor Q4 prior to the breakover of the transistor Q4. The emitter of the transistor Q4 is connected to the left side of the capacitor C3 at the terminal 272 which, in turn, is connected to the first circuit means 210 at the collector of the transistor Q5. The right side of the capacitor C3 at the terminal 282 is connected to the conductor P1 through the resistor R11 and to the base of the transistor Q7 through the diode D28. The base of the transistor Q7 is connected to the common conductor N1 through the resistor R12 which acts as a shunt resistor which is electrically connected in parallel with the base-emitter circuit of the transistor Q7 to decrease the sensitivity of the transistor Q7 and to establish the minimum current in the base-emitter circuit of the transistor Q7 necessary to actuate the transistor Q7 to a saturated condition. The emitter of the transistor Q7 is directly connected to the common conductor N1, while the collector of the transistor Q7 is connected to the collector of the transistor Q6 which forms part of the second current circuit means 220 and is also connected to the upper side of the timing or integrating capacitor C4 through the diode D30.

In general, the pulse generating circuit 230 operates as a relaxation oscillator or sawtooth voltage generator which depends upon the operating characteristics of the particular breakover device which is employed as part of the circuit 230 and which, as illustrated, is the unijunction transistor Q4. The typical operating characteristics of a suitable breakover device such as the unijunction transistor Q4, a four-layer diode, a transistor breakover circuit or other suitable circuit is such that when the voltage or potential applied between the emitter and the lower base of the transistor Q4 exceeds substantially a predetermined fraction or percentage of the potential applied between the upper base and the lower base of the transistor Q4 which may be referred to as the peak point voltage of the transistor Q4, the resistance or impedance between the emitter and the lower base of the transistor Q4 will decrease suddenly until the voltage between the emitter and the lower base of the transistor Q4 decreases to a relatively much lower voltage which may be referred to as the valley voltage of the transistor Q4 as disclosed in greater detail in the last-mentioned copending application.

In considering the detailed operation of the pulse generating circuit 230, it will be assumed initially that the voltage applied between the emitter and the lower base of the transistor Q4 is less than the peak point voltage necessary to cause the transistor Q4 to break over and that the transistor Q7 is being held in a substantially saturated condition by the base drive current which flows from the positive conductor P1 through the resistor R11, the forward connected diode D28 and the base-emitter circuit of the transistor Q7 to the common conductor N1. It is to be noted that during the assumed initial operating condition, the right side of the capacitor C3 at the terminal 282 will be held or clamped at a positive potential with respect to the common conductor N1 which is equal to the sum of the forward voltage drops across the diode D28 and the base-emitter circuit of the transistor Q7. It is also to be noted that the unidirectional output current of the second current circuit means 220 at the collector of the transistor Q6 which is maintained at substantially a predetermined or constant value for a particular value of the highest unidirectional voltage cross resistors R1, R2 and R3 will be diverted away from or by passed around the timing capacitor C4 through the collector-emitter path of the transistor Q7 to the common conductor N1, as long as the diode D28 is forward biased and the transistor Q7 is held in a saturated condition.

In the operation of the pulse generating circuit 230, assuming that the magnitude of the highest unidirectional voltage across the resistors R1, R2 and R3 which is directly proportional to the highest line current flowing in the conductors L1, L2 and L3 remains at a particular value, the unidirectional output current from the first current circuit means 210 which appears at the collector of the transistor Q5 will be maintained at a substantially predetermined or constant value and will be applied to the left side of the energy storing capacitor C3 at the terminal 272 to gradually charge the capacitor C3 in a substantially linear manner until the voltage at the terminal 272 exceeds the peak point voltage of the unijunction transistor Q4. When the voltage at the terminal 272 exceeds the peak point voltage of the transistor Q4, the transistor Q4 breaks over and the voltage at the terminal 272 at the left side of the capacitor C3 suddenly decreases from the peak point voltage to the valley voltage of the transistor Q4 with a resulting voltage change at the terminal 272 which is equal to the difference between the peak point voltage and the valley voltage of the transistor Q4. For example, the potential or voltage of terminal 272 may decrease suddenly from a voltage of approximately 10 volts which is positive with respect to the common conductor N1 to a valley voltage of approximately 3 volts which is positive with respect to the common conductor N1 when the transistor Q4 breaks over during the charging of the capacitor C3. It is to be noted that prior to the breakover of the transistor Q4, the voltage across the capacitor C3 will increase due to the charging current from the first current circuit means 210 to approximately the voltage at the terminal 272 which may, for example, be approximately 10 volts which is positive with respect to the common conductor N1 less the two forward voltage drops across the diode D28 and the base-emitter circuit of the transistor Q7 or the net voltage across the capacitor C3 may be approximately 9.4 volts prior to the breakover of the transistor Q4. When the transistor Q4 breaks over and the voltage at the terminal 272 suddenly decreases to the valley voltage of the transistor Q4, the voltage at the terminal 282 at the right side of the capacitor C3 will change correspondingly in a negative direction substantially instantaneously since there is no low resistance discharge path provided for the capacitor C3.

The voltage at the terminal 282 at the right side of the capacitor C3 will, for example, change in a negative direction to a value which is equal for example to a voltage of three volts which is positive with respect to the common conductor N1 less 9.4 volts which is the approximate voltage across the capacitor C3, for example, giving a voltage which is approximately equal to 6.4 volts which is instantaneously negative with respect to the common conductor N1. The diode D28 will then be reverse biased or blocked and the transistor Q7 will be actuated to a substantially cutoff or nonconducting condition since the base drive current will be effectively removed from the base-emitter circuit of the transistor Q7.

When the voltage at the right side of the capacitor C3 changes in a negative direction to a voltage value which is negative with respect to the voltage at the common conductor N1, the right side of the capacitor C3 will then be charged from the positive conductor P1 through the resistor R11 with the charging current flowing through the emitter and the lower base of the transistor Q4 to the common conductor N1. The voltage at the terminal 282 will gradually increase in a positive direction until the diode D28 is forward biased and the current in the base-emitter circuit of the transistor Q7 actuates the transistor Q7 to substantially a saturated condition. It is to be noted that the transistor Q4 will be held in a substantially conducting condition in the circuit which includes the emitter and the lower base of the transistor Q4 by the charging current which flows from the positive conductor P1 to the right side of the capacitor C3 until the diode D28 becomes forward biased and the transistor Q7 is actuated to substantially a saturated condition. When the transistor Q4 is no longer held in a substantially conducting condition in the circuit which includes the emitter and the lower base, the transistor Q4 will then be reset to a substantially nonconducting condition in the emitter-lower base circuit. The current from the collector of the transistor Q5 of the first current circuit means 210 is not sufficient to maintain the transistor Q4 in a substantially conducting condition by itself because of the resistor R9 which is connected in series with the emitter of the transistor Q5. The time interval or period required to charge the right side of capacitor C3 at the terminal 282 following the breakover of the transistor Q4 is determined by the time constant of the resistor-capacitor combination which includes the capacitor C3 and the resistor R11 which is charged from the voltage between the positive conductor P1 and the common conductor N1.

While the transistor Q7 is rendered substantially nonconducting or cutoff for substantially a predetermined time interval or period following the breakover of the transistor Q4, a pulse of the unidirectional output current at the collector of the transistor Q6 of the second current circuit means 220 is diverted from the collector-emitter path of the transistor Q7 to a current path which includes the diode D30 and is applied to charge the timing capacitor C4 when permitted to do so by the operation of the level detecting means 260 as will be explained hereinafter. The pulses of current which are periodically available from the collector of the transistor Q6 and which are diverted from the emitter-collector circuit of the transistor Q7 to the current path which includes the diode D30 will have a magnitude or amplitude which will vary in a substantially linear manner with the highest of the unidirectional voltages across the resistors R1, R2 and R3 and, in turn, with the highest of the line currents which flow in the conductors L1, L2 and L3, respectively. Since the time required to charge the capacitor C3 and periodically breakover the transistor Q4 will also vary in a substantially linear manner and be directly proportional to the output unidirectional current of the first current circuit means 210 at the collector of the transistor Q5, the frequency or repetition rate of the output current pulses from the pulse generating circuit 230 will also vary a substantially linear manner with the highest of the unidirectional voltages across the resistors R1, R2 and R3 and, in turn, with the highest line current which flows in the conductors L1, L2 and L3. It is to be noted that the periodic pulses of output current which are applied from the collector of the transistor Q6 to the current path which includes the diode D30 occur at the end of each sawtooth voltage waveform which is produced or generated by the pulse generating circuit 230 and that the duration of the pulses is determined by the time required to charge the right side of the capacitor C3 from the regulated voltage at the positive conductor P1 through the resistor R11 to sufficiently forward bias the diode D28 and to actuate the transistor Q7 to substantially a saturated condition following the breakover of the transistor Q4. The duration or time width of the periodic output pulses of current from the pulse generating circuit 230 will therefore remain substantially constant or at a predetermined value since the time width of said pulses will be substantially independent of variations in the highest line current which flows in the conductors L1, L2 and L3 and the corresponding highest unidirectional voltage across the resistors R1, R2 and R3, respectively. When the pulse generating circuit 230 is permitted to charge the timing or integrating capacitor C4 by the operation of the level detecting means 260, as will be explained hereinafter, the voltage across the capacitor C4 will vary in a substantially linear manner with both the frequency and the magnitude or amplitude of the pulses of output current from the collector of the transistor Q6 which flows through the diode D30 as just described. The voltage across the timing capacitor C4 therefore will vary substantially with the square of the highest unidirectional voltage across the resistors R1, R2 and R3 and, in turn, with substantially the square of the highest line current flowing in the conductors L1, L2 and L3.

In summary, the pulse generating circuit 230, as disclosed in greater detail in the copending application previously mentioned, operates to produce periodic pulses of output current to charge the timing capacitor C4 when permitted to do so by the operation of the level detecting circuit 260 with both the frequency or repetition rate and the magnitude or amplitude of the pulses of output current from the pulse generating circuit 230 varying in a substantially linear manner with the highest line current flowing in the conductors L1, L2 and L3 and with the time duration or the width of said output pulses being maintained at substantially a predetermined or constant value by the operation of the pulse generating circuit 230, as just described. As described in copending application Ser. No. 765,584 previously mentioned the operating characteristics of the pulse generating circuit 230 are such as to substantially compensate for changes in the value of the capacitor C3 and for changes in the operating characteristics in the transistor Q4 due to changes in these components with changes in environmental conditions, such as temperature.

In accordance with the invention, the level detecting circuit or means 260 of the long time delay tripping circuit 200 is connected to the first auctioneering circuit 110 and to the timing or integrating capacitor C4 to respond to the highest instantaneous unidirectional voltage across the resistors R1, R2 and R3 and, in turn, to the highest of the instantaneous line currents flowing in the conductors L1, L2 and L3 to permit the pulse generating circuit 230 to start charging the timing capacitor C4 when the highest instantaneous line current in the conductors L1, L2 and L3 exceeds a predetermined or threshold value and to permit the pulse generating circuit 230 to continue charging the timing capacitor C4 depending upon changes in the highest instantaneous line current flowing in the conductors L1, L2 and L3.

The level detecting circuit 260 includes the PNP transistors Q8 and Q9 which are connected to control the conducting state of a control means 270 which comprises a PNP transistor Q10 which is connected to normally divert the output pulses of current from the pulse generating circuit 230 away from or around the timing capacitor C4 to the common or negative conductor N1.

More specifically, the input circuit of the level detecting means 260 comprises a voltage dividing network which includes the rheostat or variable resistance means R39, the resistor R14 and the resistor R15 which are connected electrically in series with one another, the series circuit being connected between the variable output conductor V1 of the first auctioneering circuit 110 and the positive conductor P3 which provides one of the regulated, unidirectional output voltages from the power supply input circuit 100. It is important to note that the unidirectional voltage at the variable voltage conductor V1 varies substantially instantaneously with the highest of the unidirectional voltages across the resistors R1, R2 and R3, since the voltage at the conductor V1 is not filtered by the capacitor C1 as is the output voltage at the variable voltage conductor V2. The base of the transistor Q8 is connected to the junction point between the resistors R14 and R15, while the emitter of the transistor Q8 is directly connected to the positive conductor P1. The diode D29 is connected between the base and emitter of the transistor Q8 to limit the inverse voltage which is applied between the emitter and the base of the transistor Q8 when the transistor Q8 is not substantially nonconducting or cutoff and to prevent the baseemitter circuit of the transistor Q8 from breaking down under the inverse voltage which might otherwise be applied to the base-emitter circuit of the transistor Q8. The collector of the transistor Q8 is connected to the common conductor N1 through the collector load resistor R16. The transistor Q9 is directly coupled to the output of the transistor Q8 since the base of the transistor Q9 is connected to the collector of the transistor Q8, while the emitter of the transistor Q9 is directly connected to the positive conductor P1. The collector of the transistor Q9 is connected to the common conductor N1 through the collector load resistor R17. The capacitor C5 is connected between the emitter and the collector of the transistor Q9 to form a timing circuit with the resistor R17 which delays the resetting of the level detecting circuit, when the magnitude of the highest line current flowing in the conductors L1, L2 and L3 decreases below a predetermined or threshold value after exceeding the predetermined or threshold value, as will be explained hereinafter. The transistor Q10 which forms the control means 270 is directly coupled to the transistor Q9 with the collector of the transistor Q9 being directly connected to the base of the transistor Q10. The collector of the transistor Q10 is directly connected to the common conductor N1, while the emitter of the transistor Q10 is connected to the positive conductor P3 through a series circuit which includes the forward connected diode D35, the forward connected diode D46, and the resistor R35 of the output circuit 400 and the forward connected diode D45 of the output circuit 400. The resistor R18 is connected between the base and emitter of the transistor Q10 to decrease the sensitivity which might otherwise result in the operation of the transistor Q10 and to establish the minimum base-emitter current necessary to actuate the transistor Q10 to substantially a saturated condition.

Figure 4:
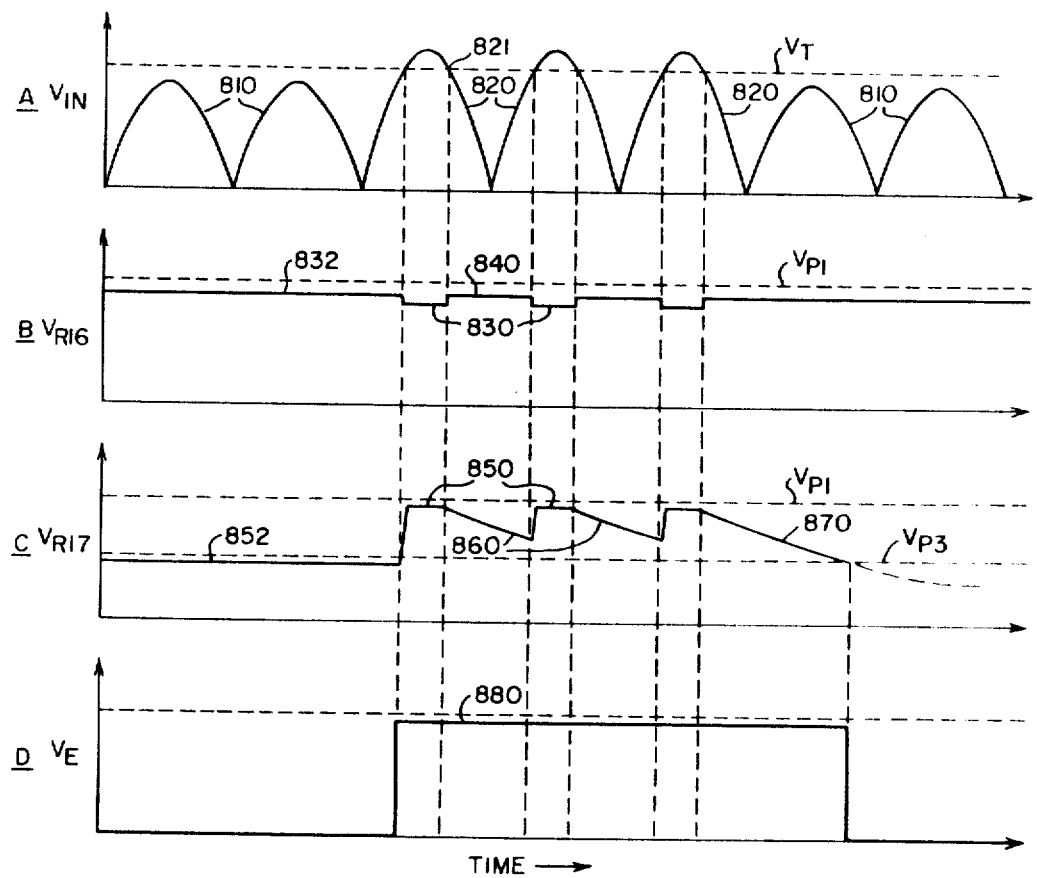
FIG. 4 is a set of waveforms or graphs illustrating the operation of a portion of the protective device shown in FIG. 1.

In the operation of the level detecting circuit 260 it is important to note that since the output of the first auctioneering circuit 110 at the variable voltage conductor V1 which forms the input of the level detecting circuit 260 is unfiltered, the input of the level detecting circuit 260 as illustrated in FIG. 4A and as indicated at $V_{IN}$ comprises a series of unidirectional output pulses as indicated at 810 and 820 each of which has substantially the configuration as the corresponding one-half cycle of the highest line current flowing in the line conductors L1, L2 and L3. In other words, the magnitude of the unidirectional voltage pulses applied at the input of the level detecting circuit 260 at the variable voltage conductor V1 varies substantially instantaneously with the corresponding highest line current flowing in the conductors L1, L2 and L3. It is also to be noted that the unidirectional voltage pulses applied at the input of the level detecting circuit 260 correspond only to the highest of the unidirectional voltages developed across the resistors R1, R2 and R3 due to the operation of the first auctioneering circuit 110, as previously explained.

When the highest instantaneous line current flowing in the conductors L1, L2 and L3 is less than substantially a predetermined value and the corresponding highest instantaneous unidirectional voltage across the resistors R1, R2 and R3, as indicated at 810 in FIG. 4A, is less than a substantially predetermined or threshold voltage, as indicated at $V_T$ in FIG. 4A, the transistor Q8 of the level detecting circuit 260 is actuated to substantially a saturated condition since the emitterbase circuit of the transistor Q8 is forward biased and a base drive current flows from the positive conductor P1 through the emitter-base circuit of the transistor Q8 and the resistor R15 to the positive conductor P3. When the transistor Q8 is in a normally saturated condition, the voltage drop across the resistor R15 which is connected between the base of the transistor Q8 and the conductor P3 is equal to the voltage difference between the conductors P1 and P3 less the forward voltage drop across the emitter-base circuit of the transistor Q8. For example, if the unidirectional voltage at the conductor P1 is approximately 33 volts which is positive with respect to the common conductor N1 and the voltage at the conductor P3 is approximately 16.5 volts which is positive with respect to the common conductor N1, the voltage across the resistor R15 will be approximately 16.5 volts less the forward voltage drop across the emitter-base circuit of the transistor Q8 or approximately 16 volts. In other words, when the transistor Q8 is in a normally saturated condition, the voltage at the base of the transistor Q8 will differ from the voltage at the positive conductor P1 only by the forward voltage drop of the emitter-base circuit of the transistor Q8. The sum of the instantaneous voltage drops across the rheostat R39 and the resistor R14 will be substantially equal to the highest of the instantaneous unidirectional voltages across the resistors R1, R2 and R3, since the forward voltage drop across one of the diodes D17, D18 or D19 of the first auctioneering circuit 110 will substantially compensate or the forward voltage drop across the emitter-base circuit of the transistor Q8 and will also assist in temperature compensating the operation of the level detecting circuit 260 for variations which may occur in the forward voltage drop across the emitter-base circuit of the transistor Q8 due to changes in the environmental temperature. Since the sum of the voltage drops across the rheostat R39 and the resistor R14 is substantially equal to the highest of the unidirectional voltages across the resistors R1, R2 and R3, the current flowing through rheostat R39 and the resistor R14 will be equal to the highest unidirectional voltage across said resistors divided by the sum of the resistances of the rheostat R39 and the resistor R14.

As the highest unidirectional voltage across the resistors R1, R2 and R3 increases prior to reaching the predetermined voltage previously mentioned, the current which flows through the rheostat R39 and the resistor R14 increases while the current which flows the emitter-base circuit of the transistor Q8 decreases. This is because the voltage across the resistor R15 is constrained to be equal to the voltage difference between the conductors P1 and P3 less the forward voltage drop across the emitter-base circuit of the transistor Q8 as long as said transistor remains in a saturated condition, as previously explained.

As long as the transistor Q8 remains in a saturated condition, the current which flows in the resistor R16 will be diverted to the emitter-collector circuit of the transistor Q8 and the voltage drop across the resistor R16 will be as illustrated at $V_{R16}$ in FIG. 4B. The voltage drop across the resistor R16 is indicated at 832 in FIG. 6 when the transistor Q8 is in a saturated condition. The diverting of the current which flows in the resistor R16 through the emitter-base circuit of the transistor Q8 will maintain the transistor Q9 in a substantially nonconducting or cutoff condition. As long as the transistor Q9 is maintained in a substantially nonconducting or cutoff condition, the current flow through the emitter-collector circuit of the transistor Q9 will be substantially negligible and the voltage drop across the resistor R17 which is illustrated at $V_{R17}$ in FIG. 4C and which is due, in part, to the emitter-collector current of the transistor Q9 will be relatively low, as indicated at 852 in FIG. 4C. The voltage at the base of the transistor Q10 which is connected to the upper end of the resistor R17 will therefore be at a value, as indicated at 852 in FIG. 4C which is relatively close to the voltage at the common conductor N1 and a base drive current will flow from the positive conductor P3 through the series circuit which includes the diode D45, the resistor R35, the diode D46, the diode D35, the emitter-base circuit of the transistor Q10 and the resistor R17 to the common conductor N1. The transistor Q10 will therefore be normally maintained in substantially a saturated condition to thereby provide a low resistance path from the upper side of the timing or integrating capacitor C4 through the forward connected diode D31, the forward connected diode D35 and the emitter-collector circuit of the transistor Q10 to the common or negative conductor N1 to thereby prevent the output pulses of current from the pulse generating circuit 230 from cumulatively charging the timing capacitor C4. In other words, the effective output of the level detecting circuit 260 which may be considered to be the voltage at the emitter of the transistor 210 with respect to the common conductor N1 which is illustrated at $V_E$ in FIG. 4D substantially negligible as long as the highest line current flowing in the conductors L1, L2 and L3 remain below a predetermined or threshold value and the transistor Q10 is held in a saturated condition as just described. It is to be noted that in the normal operating condition of the level detecting circuit 260, as long as the highest line current flowing in the conductors L1, L2 and L3 remains below a predetermined or threshold value and the corresponding highest unidirectional voltage across the resistors R1, R2 and R3 remains below a corresponding predetermined voltage value, the transistor Q9 will remain in a substantially nonconducting or cutoff condition and the capacitor C5 which is connected between the emitter and the collector of the transistor Q9 will charge to a voltage which is substantially equal to the voltage difference between the positive conductor P1 and the common conductor N1 less a relatively small voltage drop across the resistor R17.

When the highest line current flowing in the conductors L1, L2 and L3 exceeds or increases to a value above the predetermined or threshold value to which the level detecting circuit 260 responds and the corresponding highest unidirectional instantaneous voltage across the resistors R1, R2 and R3 as indicated at 820 in FIG. 4A exceeds a corresponding predetermined or threshold voltage value, as indicated at $V_T$ in FIG. 4A, the current through the rheostat R39 and the resistor R14 increases while the transistor Q8 is still in a saturated condition until the current in the emitter-base circuit of the transistor Q8 decreases to an negligible value and the transistor Q8 is thereby actuated to a substantially nonconducting or cutoff condition. It is to be noted that the predetermined highest instantaneous line current in the conductors L1, L2 and L3 at which the transistor Q8 is actuated to a substantially nonconducting condition may be adjusted by the setting of the rheostat R39. When the transistor Q8 is actuated to a substantially nonconducting condition, the current in the emitter-collector path of the transistor Q8 decreases to a substantially negligible value and the current which flows in the resistor R16 now flows from the positive conductor P1 through the emitter-base circuit of the transistor Q9. The voltage drop across the resistor R16 also decreases to a relatively lower value, as indicated at 830 in FIG. 4B. The transistor Q9 then carries saturated current in the emitter-collector circuit of the transistor Q9 to increase the voltage drop across the resistor R17, as indicated at 850 in FIG. 4C, with the voltage at the base of the transistor Q10 increasing to a value which is substantially equal to the voltage at the emitter of the transistor Q10 to thereby remove the forward bias from the emitter-base circuit of the transistor Q10 and to actuate the transistor Q10 to substantially nonconducting or cutoff condition. When the transistor Q10 which forms the control means 270 is actuated to a substantially nonconducting condition, the voltage at the emitter of the transistor Q10 increases to a relatively larger value which is positive with respect to the common conductor N1, as indicated at 880 in FIG. 4C, to reverse bias the diode D35 and to operatively remove the low resistance path between the upper side of the timing capacitor C4 and the common conductor N1 through the diodes D31 and D35. The timing capacitor C4 is then permitted to start accumulating a charge from the output pulses of current from the pulse generating circuit 230 with the voltage across the timing capacitor C4 gradually increasing in accordance with substantially the square of the highest unidirectional voltage across the resistors R1, R2 and R3 and, in turn, with the square of the highest line current flowing through the conductors L1, L2 and L3.

When the transistor Q9 is actuated to a substantially saturated condition in response to a predetermined instantaneous overload current flowing in one of the line conductors L1, L2 and L3 as reflected by the highest unidirectional voltage across one of the resistors R1, R2 and R3, as indicated at 820 in FIG. 4A, the capacitor C5 which was previously charged up to a voltage equal to the difference in voltage between the conductors P1 and N1 less the voltage drop across the resistor R17 will rapidly discharge through the emitter-collector path of the transistor Q9 until the capacitor C5 is substantially completely discharged. If the highest instantaneous line current flowing in the conductors L1, L2 and L3 and the corresponding highest unidirectional voltage across the resistors R1, R2 and R3 should instantaneously decrease to values below the predetermined or threshold values, as indicated at 821 in FIG. 4A, after the level detecting circuit 260 has operated to actuate the transistor Q10 to a substantially nonconducting condition, the transistor Q8 will be substantially instantaneously restored to a saturated condition and the transistor Q9 will be substantially instantaneously returned to a substantially nonconducting condition. Since the sum of the voltage drops across the capacitor C5 and the resistor R17 is equal to the voltage difference between the conductors P1 and N1, the voltage across the capacitor C5 following its discharge by the actuating of the transistor Q9 to substantially a saturated condition and the instantaneous return of the transistor Q9 to a substantially nonconducting condition due to instantaneous changes in the highest line current in said conductors will increase relatively slowly after the transistor Q9 is restored to a substantially nonconducting condition due to the presence of the resistor R17 in the charging path of the capacitor C5. The charging current which flows to the charging capacitor C5 after the transistor Q9 is returned to a substantially nonconducting condition will produce a gradually decreasing voltage drop across the resistor R17, as indicated at 860 in FIG. 4C, which is sufficient to maintain the transistor Q10 in a substantially nonconducting condition for a predetermined time period or interval after the highest instantaneous unidirectional voltage across the resistors R1, R2 and R3 decreases below the predetermined value or threshold value necessary to actuate the level detecting circuit 260. In other words, if the highest instantaneous line current flowing in the conductors L1, L2 and L3 should exceed a predetermined overcurrent value which corresponds to the highest unidirectional voltage across the resistors R1, R2 and R3, as indicated at 820 in FIG. 4A, and then instantaneously should decrease below the predetermined instantaneous value which corresponds to the highest unidirectional voltage across said resistors, as indicated at 821 in FIG. 4A, the transistor Q10 will be maintained in a substantially nonconducting condition by the timing circuit which includes the capacitor C5 and a resistor R17 which will delay the resetting of the level detecting circuit 260 for a predetermined time period or interval which may, for example, be slightly longer than the time duration of one-half cycle of the alternating current which flows in the conductors L1, L2 and L3.

If the highest of the instantaneous line currents which flow in the conductors L1, L2 and L3 should exceed the predetermined overload current to which the level detecting circuit 260 responds and then instantaneously decrease for a period of time less than the time delay or interval for which the level detecting circuit 260 is set by the timing circuit which includes the capacitor C5 and a resistor R17, the transistor Q10 will be maintained in a substantially nonconducting condition to permit the timing capacitor C4 to continue accumulating charge from the output pulses of current from the pulse generating circuit 230, as indicated at 860 in FIG. 4C. If however the time interval between successive periods of instantaneous overcurrent which correspond to successive periods of instantaneous unidirectional voltage across the resistors R1, R2 and R3, as indicated at 820 in FIG. 4A, should exceed the time delay period for which the level detecting circuit 260 is set by the timing circuit which includes the capacitor C5 and a resistor R17, as indicated at 870 in FIG. 4C, the transistor Q10 then be restored to a substantially saturated condition and rapidly reset the timing capacitor C4 by rapidly discharging the timing capacitor C4 through the circuit which includes the diodes D31 and D35 and the emitter-collector circuit of the transistor Q10 to thereby reset the timing capacitor C4 so that the time delay provided by the overall long time delay tripping circuit 200 would have to again start from an initial operating point on the timing capacitor C4. The voltage at the emitter of the transistor Q10 would then be restored to a negligible value as indicated at the right end of FIG. 4D.

In summary, the level detecting circuit 260 provided a relatively fast resetting time since the level detecting circuit 260 responds to the instantaneous value of the highest unidirectional voltage across resistors R1, R2 and R3 and, in turn, to the highest instantaneous line current flowing in the conductors L1, L2 and L3 to initiate the start of the predetermined time delay provided by the long time delay tripping circuit 200 but resets the timing capacitor C4 if the time interval between successive instantaneous periods of overcurrent above the predetermined or threshold value for which the level detecting circuit 260 is adjusted is longer than the predetermined time period provided by the timing circuit of the level detecting circuit 260 which comprises the capacitor C5 and the resistor R17 which may be, for example, slightly longer than one-half cycle of the alternating current flowing in the conductors L1, L2 and L3. It is to be noted that the timing circuit included as part of the level detecting circuit 260 is reset to the beginning of the time delay provided in the resetting of the level detecting circuit 260 each time that the instantaneously highest line current flowing in the conductors L1, L2 and L3 exceeds the predetermined or threshold value to which the level detecting circuit 260 responds and the timing circuit of the level detecting circuit 260 remains reset at the initial operating point until the highest instantaneous line current flowing in the conductors L1, L2 and L3 decreases below the predetermined or threshold value. As previously mentioned, the timing circuit of the level detecting circuit 260 times out if the time interval between successive instantaneous periods of overcurrent exceeds the predetermined time interval for which the timing circuit of the level detecting circuit 260 is set but permits the timing of the long time delay tripping circuit 200 to continue in an uninterrupted fashion if the time interval between successive periods of instantaneous overcurrent is less than the predetermined time interval which is provided by the timing circuit of the level detecting circuit 260. In other words, the level detecting circuit 260 provides a relatively fast resetting response without chopping or interrupting the effective output of the level detecting circuit 260 as indicated at 880 in FIG. 4D.

It is to be noted that the predetermined overcurrent level to which the level detecting circuit 260 responds is normally relatively lower than the instantaneous overload current to which the instantaneous tripping circuit 300 responds as will be described hereinafter. It is also to be noted that when the transistor Q10 which forms the control means 270 is in a substantially saturated condition, the diode D31 is forward biased and the output pulses of current from the pulse generating circuit 230 which flow from the collector of the transistor Q6 will flow to the common conductor N1 through a current path which extends from the collector of the transistor Q6 through the diodes D30 and D31, the diode D35, and the emitter-collector circuit of the transistor Q10. Whenever the transistor Q10 is actuated to a substantially nonconducting or cutoff condition, the voltage applied at the cathode of the diode D31 from the positive conductor P3 through the diode D45, the resistor R35 and the diode D46 will be sufficient to reverse bias the diode D31 and permit the timing capacitor to accumulate a charge from the output pulses of current from the pulse generating circuit 230 which flow from the collector of the transistor Q6 through the diode D30 to the upper side of the timing capacitor C4.

In the overall operation of the long time delay tripping circuit 200, when the capacitor C4 is permitted to charge from the output pulses of current of the pulse generating circuit 230, the voltage across the capacitor C4 increases in discrete steps until the voltage at the upper side of the capacitor C4 is sufficiently positive to forward bias the diode D31. When the diode D31 is forward biased by the voltage at the upper side of the capacitor C4 increasing to a predetermined or threshold value, the output pulses of current from the collector of the transistor Q6 are applied through the diodes D30 and D31 to the output circuit 400, as will be explained hereinafter, to actuate the operation of the output circuit 400 to energize the trip coil 36 of the circuit breaker CB to thereby actuate the opening of said circuit breaker. Since the average charging current applied to the timing capacitor C4 from the pulse generating circuit 230 when the pulse generating circuit 230 is permitted to charge the capacitor C4 is substantially proportional to the square of the highest unidirectional voltage across the resistors R1, R2 and R3 and, in turn, to the highest line current flowing in the conductors L1, L2 and L3, the time delay required to charge the capacitor C4 to substantially a predetermined or threshold voltage sufficient to actuate the output circuit 400 varies substantially inversely with the square of the highest line current which flows in the conductors L1, L2 and L3. In order to limit the necessary size of the timing capacitor C4 to a practical value which is sufficient to provide the time delay required for different values of overload currents, the magnitude of the output unidirectional current pulses from the transistor Q6 is limited to a certain range of current values. Under certain operating conditions, such as relatively lower overload currents, the unidirectional output pulses of current at the collector of the transistor Q6 which are applied through the diodes D30 and D31 when the voltage across the capacitor C4 reaches the predetermined or threshold value, may not be sufficient to actuate the operation of the output circuit 400.

In order to increase the sensitivity of the long time delay tripping circuit 200 and to ensure that the output pulses of current applied from the long time delay tripping circuit 200 to actuate the output circuit 400 are sufficient for all operating conditions as required in a particular application, the auxiliary pulse generating circuit 240 is connected to the pulse generating circuit 230 to periodically increase the voltage available at the upper side of the timing capacitor C4. More specifically the auxiliary pulse generating circuit 240 is provided to periodically increase the voltage between the lower side of the timing capacitor C4 and the common or negative conductor N1.

More specifically, the auxiliary pulse generating circuit 240 comprises a NPN transistor Q3. The base of the transistor Q3 is connected to the positive conductor P1 through the resistor R7 and is coupled to the upper base of the unijunction transistor Q4 of the pulse generating circuit 230 by the capacitor C2, while the emitter of the transistor Q3 is directly connected to the common or negative conductor N1. The collector of the transistor Q3 is connected to the positive conductor P1 through the collector load resistor R8 and also to the lower side of the timing capacitor C4. It is to be noted that the diode D34 is connected between the lower side of the timing capacitor C4 and the common or negative conductor N1 to complete the discharge path for the timing capacitor C4 during the actuation of the output circuit 400 by the long time delay tripping circuit 200, as will be explained hereinafter. The diode D32 which may comprise one or more diodes, as required in a particular application, is connected between the collector of the transistor Q3 and the common or negative conductor N1 to limit the magnitude of the output pulses of voltage from the auxiliary pulse generating circuit 240 to the forward voltage drop of the diode D32.

In the operation of the auxiliary pulse generating circuit 240, the transistor Q3 is normally maintained in a substantially saturated condition by the base drive current which flows from the positive conductor P1 through the resistor R7 and the base emitter circuit of the transistor Q3 to the negative or common conductor N1. When the transistor Q3 is in a substantially saturated condition, the lower side of the timing capacitor C4 is at substantially the same potential as the common or negative conductor N1, since the voltage drop across the collector-emitter circuit of the transistor Q3 is substantially negligible when the transistor Q3 is in a substantially saturated condition. When however the unijunction transistor Q4 of the pulse generating circuit 230 periodically breaks over during the operation of the pulse generating circuit 230, a negative voltage pulse is produced at the upper base of the transistor Q4 each time that the transistor Q4 breaks over and this negative voltage pulse is transmitted or coupled to the base of the transistor Q3 through the capacitor C2 to thereby actuate the transistor Q3 to substantially a nonconducting or cutoff condition. When the transistor Q3 is periodically actuated to a substantially nonconducting condition by the operation of the pulse generating circuit 230, the voltage at the collector of the transistor Q3 increases in a positive direction and raises the voltage at the lower side of the timing capacitor C4 by an amount equal to the forward voltage drop of the diode D32. In the overall operation of the long time delay tripping circuit 200, as the charge on the timing capacitor C4 approaches the predetermined or threshold value necessary to forward bias the diode D31, the auxiliary or supplementary periodic output voltage pulses applied at the lower side of the capacitor C4 effectively increase the voltage at the upper side of the capacitor C4 with respect to the common or negative conductor N1 and permit the output pulses of current from the collector transistor Q6 to be applied through the diode D31 when the total voltage effective at the upper side of the capacitor C4 reaches the predetermined or threshold value necessary to actuate the output circuit 400. The operation of the output circuit 400 is thus assured over the entire range of overload currents to which the long time delay tripping circuit 200 responds. It is to be noted that the diode D27 is connected between the base and the emitter of the transistor Q3 for the purpose of limiting the change in voltage at the left side of the capacitor C2 when the transistor Q3 is periodically actuated to a nonconducting condition to thereby assist in controlling the width of the output pulses at the collector of the transistor Q3 and protecting the base-emitter circuit of the transistor Q3 from excessive reverse bias voltages.

Output Circuit 400

In general, the output circuit 400 of the protective device shown in FIG. 1 is connected to the long time delay tripping circuit 200 to respond to substantially a predetermined charge on the capacitor C4 which corresponds to a predetermined or threshold voltage across said capacitor to actuate the energization of the trip coil 36 of the circuit breaker CB following a predetermined time delay after the operation of the level detecting circuit 260 permits the timing capacitor C4 to start accumulating the charge. More specifically the output circuit 400 comprises an output level detecting circuit 410 which is connected to the timing capacitor C4 through the diode D31, the semiconductor switching device Q17 whose operation is actuated by the output level detecting circuit 410 and the auxiliary potential source 420 which is provided to maintain certain operating potentials during certain operating conditions, as will be explained hereinafter.

The output level detecting circuit 410 is of the breakover type in that once the operation of the output level detecting circuit 410 is initiated, the operation of said circuit continues or proceeds by regenerative action until the operation of said circuit is completed. The output level detecting circuit 410 comprises the PNP transistor Q15 and the NPN transistor Q16. The emitter of the transistor Q15 is connected to the upper side of the timing capacitor C4 through the diode D31, while the base of the transistor Q15 is connected to the P3 through the resistor R35 and the forward connected diode D45. The collector of the transistor Q15 is connected to the base of the transistor Q16 through the diode D47 and also to the control means 150 of the power supply input circuit 100 through the isolating diode D48 in order to prevent the operation of the output circuit 400 in the event that the energy storing capacitor C13 of the power supply input circuit 100 is not fully charged, as previously explained. As shown in FIG. 2, the collector of the transistor Q16 is directly connected to the base of the transistor Q15, while the emitter of the transistor Q16 is connected to the common or negative conductor N1 through the resistor R34 and also to the gate electrode of the silicon controlled rectifier or semiconductor switching device Q17. The resistor R33 is connected between the emitter and the base of the transistor Q15 in order to normally maintain the potential at the emitter of the transistor Q15 at substantially the same potential as at the base of the transistor Q15. In order to protect the emitter-base circuit of the transistor Q15 from excess reverse bias during certain operating conditions, the diode D46 is connected between the emitter and the base of the transistor Q15 to limit the reverse voltage across the emitter-base circuit of the transistor Q15 to the forward voltage drop of the diode D46. The capacitor C11 is connected between the emitter and the base of the transistor Q15 to provide some degree of noise suppression in the operation of the output level detecting circuit 410 by bypassing transient voltage surges which may occur in the overall operation of the protective device shown in FIG. 1 around the emitter-base circuit of the transistor Q15. The resistor R32 is connected between the base of the transistor Q16 and the common or negative conductor N1 to provide a shunt path around the base-emitter circuit of the transistor Q16 for the leakage current which might flow at relatively high environmental temperatures from the collector to the base of the transistor Q16. The resistor R32 prevents this leakage current from flowing from the base of the emitter of the transistor Q16 and being amplified by the current gain of the transistor Q16 which might cause improper tripping operations due to the gating of the silicon controlled rectifier Q17. The resistor R32 also determines the amount of current at the emitter of the transistor Q15 which is necessary to actuate the operation of the output level detecting circuit 410.

The auxiliary potential source 420 is connected to the output level detecting circuit 410 to temporarily maintain the voltage at the base of the transistor Q15 whenever the overall protective device shown in FIG. 1 is deenergized. The auxiliary potential source 420 maintains this voltage sufficiently long enough to prevent an improper operation of the output level detecting circuit 400 when the voltages at the positive conductors P1, P2 and P3 collapse at a relatively fast rate and the voltage on the timing capacitor C4 might be sufficient to actuate the operation of the output level detecting circuit 410 and to cause an improper tripping operation of the circuit breaker CB The auxiliary potential source 420 comprises the diode D45 which is connected between the positive conductor P3 and the right end of the resistor R35, the capacitor C12 which is connected between the junction point of the resistor R35 and the diode D45 and the common or negative conductor N1, and the resistor R36 which is connected between the upper side of the capacitor C12 and the common or negative conductor N1. It is to be noted that the resistor R36 provides a relatively slow discharge path for the capacitor C12 after the overall protective device shown in FIG. 1 has been deenergized for a certain time period and the auxiliary potential source 420 has performed its intended purpose. It is to be noted that the auxiliary potential source 420 also prevents improper tripping operations in the event that the overall protective device should be temporarily deenergized due to a temporary loss of power.

In order to energize the trip coil 36 of the circuit breaker CB in response to the operation of the output level detecting circuit 410, the anode of the silicon controlled rectifier or semiconductor switching device Q17 is connected to the positive conductor P1 through the resistor R37, while the cathode of the silicon controlled rectifier Q17 is connected to the common or negative conductor N1. The trip coil 36 is electrically connected in parallel with the resistor R37 between the positive conductor P1 which, in turn, is connected to one side of the supply capacitor C13 and the junction point between the resistor R37 and the anode of the silicon controlled rectifier Q17. More specifically, the trip coil 36 is connected between the terminal 414, as shown in FIG. 1, which, in turn, is connected to the positive conductor P1 and the terminal 422 which is connected, in turn, to the junction point between the resistor R37 and the anode of the silicon controlled rectifier Q17. In order to prevent an improper operation of the silicon controlled rectifier Q17 due to transient voltage surges which may occur during the overall operation of the protective device shown in FIG. 1, a noise suppression network, which includes the resistor R44 and the capacitor C17 connected in series, is connected between the anode and the cathode of the silicon controlled rectifier Q17 to bypass transient voltage surges around the silicon controlled rectifier Q17.

In the overall operation of the output circuit 400, when the level detecting circuit 260 of the long time delay tripping circuit 200 permits the timing capacitor C4 to accumulate charge from the pulse generating circuit 230, the voltage across the timing capacitor C4 increases in discrete steps at a rate which varies substantially with the square of the highest line current which flows in the conductors L1, L2 and L3, as previously explained, until the voltage across the timing capacitor C4 is sufficient to forward bias the diode D31. When the diode D31 is forward biased by the voltage at the upper side of the timing capacitor C4 which is periodically increased by the auxiliary pulse generating circuit 240, as previously explained, an input current for the output circuit 400 flows from the collector of the transistor Q6 through the diodes D30 and D31, through the emitter-base circuit of the transistor Q15 of the output level detecting circuit 410 to thereby increase the current which flows from the emitter to the collector of the transistor Q15. The increased current flow through the emitter-collector circuit of the transistor Q15 flows through the diode D47 and the base-emitter circuit of the transistor Q16. When the transistor Q16 starts to conduct current in its base-emitter circuit, the current which flows from the collector to the emitter of the transistor Q16 also increases to thereby additionally increase the current flow from the emitter to the base of the transistor Q15. It is to be noted that the current which flows in the collector-emitter path of the transistor Q16 also flows from the positive conductor P3 through the diode D45 and the resistor R35 through the collector-emitter circuit of the transistor Q16 and to the common conductor N1 through the resistor R34. The effect of the increase in the collector-emitter current of the transistor Q16 and its consequent effect on the emitter-base current of the transistor Q15 increases until both of the transistors Q15 and Q16 are actuated to a substantially saturated condition. The output current of the output level detecting circuit 410 from the emitter of the transistor Q16 also flows through the gate of the silicon controlled rectifier Q17 into the anode of the silicon controlled rectifier Q17 to thereby actuate the silicon controlled rectifier Q17 to a substantially conducting condition. When the silicon controlled rectifier Q17 is actuated to a substantially conducting condition, the trip coil 36 is energized by the current which flows from the positive conductor P1 through the trip coil 36 and through the anode-cathode circuit of the silicon controlled rectifier Q17 to the common or negative conductor N1 to thereby actuate a tripping operation of the circuit breaker CB. It should be noted that the current which energizes the trip coil 36 flows from the right side of the energy storing capacitor C13 through the positive conductor P1, the trip coil 36, the anode-cathode circuit of the silicon controlled rectifier Q17 to the common conductor N1 and then to the left side of the capacitor C13.

In the event that the capacitor C13 is not charged sufficiently to energize the trip coil 36, the control means 150 will prevent the operation of the output circuit 400 by providing a relatively low resistance path from the collector to the transistor Q15 through the diode D48 which will then be forward biased and through the collector-emitter circuit of the transistor Q2 of the control means 150 to the common or negative conductor N1 which prevents the regenerative operation of the output circuit 400.

It is to be noted that after the trip coil 36 is energized by the discharge of the capacitor C13 through said trip coil and the silicon controlled rectifier Q17, the resistor R37 which is connected in series with the anode cathode circuit of the silicon controlled rectifier Q17 provides a circulating path to dissipate the stored energy in the trip coil 36 which normally involves an inductive device and thereby limits the inverse voltage applied to the silicon controlled rectifier Q17 to a value within the rating of the silicon controlled rectifier Q17.

As previously mentioned, the auxiliary pulse generating circuit 240 is provided to periodically increase the voltage at the lower side of the timing capacitor C4 and in effect at the upper side of the timing capacitor C4 in order to insure that the input current applied to the output circuit 400 will be sufficient over the entire range of overload currents to which the long time delay tripping circuit 200 is intended to respond.

In summary, the overall operation of the protective device shown in FIG. 1 due to the long time delay tripping circuit 200 is such that the tripping time in seconds of the associated circuit breaker varies substantially inversely with the square of the overcurrent over a predetermined range or overcurrents to which the long time delay tripping circuit 200 responds. The predetermined highest line current which actuates the start of the time delay provided in the operation of the long time delay tripping circuit 200 may be controlled between predetermined limits by the setting of the rheostat R39 which forms part of the level detecting circuit 260 of the long time delay tripping circuit 200. The minimum time delay characteristic provided by the time delay tripping circuit 200 may be obtained by the adjustment of the rheostat R38 which forms part of the second current circuit means 220 of the maximum time delay characteristic provided by said long time delay tripping circuit may be similarly obtained by the adjustment of the rheostat R38 with a family of intermediate time delay characteristics being available by the adjustment of the rheostat R38 between the limiting adjustments. In other words, the long time delay tripping circuit 200 provides substantially an $I^2_t = K$ (where $K$ equals a constant and $t$ equals tripping time) operating characteristic which may be varied in a substantially continuous manner between a minimum time delay characteristic and a maximum time delay characteristic by the adjustment of the rheostat R38 which, in effect, varies the constant to which $I^2_t$ is substantially equal over a predetermined operating range of overload currents. As previously explained, if the highest line current flowing in the conductors L1, L2 and L3 exceeds the predetermined or threshold value to which the level detecting circuit 260 responds as determined by the setting of the rheostat R39, the timing capacitor C4 will be permitted to start accumulating a charge from the pulse generating circuit 230. If however the highest line current flowing in the conductors L1, L2 and L3 then instantaneously decreases to a value less than the predetermined value to which the level detecting circuit responds and remains less than the predetermined value, the timing capacitor C4 will be reset by the level detecting circuit 260 after a predetermined time interval or delay which depends upon the operation of the timing circuit which forms part of the level detecting 260 and which may be adjusted or selected to be slightly longer than one-half cycle of the alternating current flowing in the conductors L1, L2 and L3 assuming that the last-mentioned time interval before the resetting of the capacitor C4 ends before the voltage across the capacitor C4 is sufficient to actuate the operation of the output level detecting circuit 410. The reset of the timing capacitor C4 will be accomplished by restoring the control means 270 which comprises the transistor Q10 to substantially a saturated position which rapidly discharges the timing capacitor C4 at the end of the time interval just mentioned. It is to be noted that the control means 270 is of the emitter follower type.

Instantaneous Tripping Circuit 300

Referring now to the instantaneous tripping circuit 300 indicated in block form in FIg. 1 and shown in detail in FIG. 2, the instantaneous tripping circuit 300, in general, is connected between the first auctioneering circuit 110 of the power supply input circuit 100 and the level detecting circuit 410 of the output circuit 400 to actuate the energization of the trip coil 36 of the circuit breaker CB when the highest instantaneous line current flowing in the conductors L1, L2 and L3 increases above or exceeds substantially a predetermined or threshold value without any intentional time delay.

More specifically, the instantaneous tripping circuit 300 as shown in FIG. 2 comprises a PNP transistor Q18 and a voltage dividing network which includes the rheostat R42, the resistor R24 and the resistor R89 which are connected electrically in series with one another between the variable voltage output conductor V1 of the first auctioneering circuit 110 and the positive conductor P3. The emitter of the transistor Q18 is connected to the junction point between the resistors R24 and R89, while the base of the transistor Q18 is connected to the positive conductor P2 in order that the forward voltage drop across the diode D23 which may include one or more forward connected diodes in a particular application compensate the input voltage of the instantaneous tripping circuit 300 for the forward voltage drop across one of the diodes D17, D18 or D19 of the first auctioneering circuit 110 and for the forward voltage drop across the emitter-base circuit of the transistor Q18 during the operation of the instantaneous tripping circuit 300. The diode D39 is connected between the emitter and the base of the transistor Q18 in order to protect the emitter-base circuit of the transistor Q18 from excessive reverse bias by limiting the maximum reverse voltage applied to the emitter-base circuit of the transistor Q18 to the forward voltage drop of the diode D39. The collector of the transistor Q18 is connected to the common conductor N1 by the collector load resistor R25. The output of the instantaneous tripping circuit 300 at the collector of the transistor Q18 is connected to the emitter of the transistor Q15 of the output level detecting circuit 410 by the isolating diode D40 whose anode is connected to the collector of the transistor Q18 and whose cathode is connected to the emitter of the transistor Q15. The capacitor C8 is connected electrically in parallel with the resistor R25 between the collector of the transistor Q18 and the common conductor N1 in order to provide a predetermined degree of noise suppression in the operation of the instantaneous tripping circuit 300 by diverting the output of the instantaneous tripping circuit 300 to the common conductor N1 when the output is due to transient voltage surges which may occur during the operation of the overall protective device shown in FIG. 1 and also to provide a pulse of discharge current to the output level detecting circuit 410 of the output circuit 400 during the operation of the instantaneous tripping circuit 300 to insure that the transistors Q15 and Q16 are both actuated to substantially saturated conditions and to insure that the silicon controlled rectifier Q17 is actuated to a substantially conducting condition to energize the trip coil 36 during the overall operation of the protective device shown in FIG. 1.

In the operation of the instantaneous tripping circuit 300, the base of the transistor Q18 is held at the regulated, unidirectional potential at the positive conductor P2. The voltage at the emitter of the transistor Q18 varies with and is directly proportional to the highest unidirectional voltage across the resistors R1, R2 and R3 and, in turn, to the highest instantaneous line current flowing in the conductors L1, L2 and L3. More specifically, the voltage at the emitter of the transistor Q18 is equal to the voltage at the positive conductor P3 plus the voltage drop across the resistor R89 which depends, in part, on the setting of the rheostat R42. As long as the highest instantaneous line current flowing in the conductors L1, L2 and L3 remain below substantially a predetermined or threshold value, the emitter-base circuit of the transistor Q18 is reverse biased and the transistor Q18 is substantially nonconducting or cutoff. As long as the transistor Q18 is substantially nonconducting or cutoff, the current flow through the resistor R25 in the collector circuit of the transistor Q18 is substantially negligible and the potential of the anode of the diode D40 is relatively close to the potential at the common or negative conductor N1 with the diode D40 being normally reverse biased or blocked due to the potential which is applied to the cathode of the diode D40 from the positive conductor P3 through the diode D45, the resistor R35 and the diode D46. When the highest instantaneous line current flowing in one of the conductors L1, L2 and L3 exceeds substantially a predetermined or threshold value to which the instantaneous tripping circuit 300 is adjusted to respond by the setting of the rheostat R42, and the corresponding highest instantaneous unidirectional voltage across the resistors R1, R2 and R3 exceeds substantially a predetermined value, the voltage at the emitter of the transistor Q18 increases in a positive direction sufficiently to forward bias the emitter-base circuit of the transistor Q18 and to actuate the transistor Q18 to substantially a saturated condition. Due to the increased current flow in the emitter-collector path of the transistor Q18, the voltage drop across the resistor R25 increases to thereby forward bias the diode D40 and the output current of the instantaneous tripping circuit 300 from the collector of the transistor Q18 flows through the diode D40 and into the emitter-base circuit of the transistor Q15 to actuate the output level detecting circuit 410 to, in turn, actuate the silicon controlled rectifier Q17 to a substantially conducting condition and to energize the trip coil 36, as previously explained in connection with the operation of the long time delay tripping circuit 200. As previously mentioned, when the highest instantaneous line current flowing in the conductors L1, L2 and L3 exceeds substantially a predetermined or threshold value for which the rheostat R42 is adjusted, the instantaneous tripping circuit actuates the energization of the trip coil 36 in a substantially instantaneous manner without giving any intentional time delay. In the operation of the instantaneous tripping circuit 300 it is to be noted that as the highest instantaneous line current in the conductors L1, L2 and L3 increases toward the predetermined value to which the instantaneous tripping circuit 300 responds, the control means 270, which form part of the level detecting means or circuit 260 of the long time delay tripping circuit 200 will be actuated from a normally saturated condition to a substantially nonconducting or cutoff condition prior to the operation of the instantaneous tripping circuit 300 to thereby eliminate the relatively low resistance path to the common conductor N1 from the emitter of the transistor Q15 which would otherwise divert the output current of the instantaneous tripping circuit 300 away from the emitter of the transistor Q15.

It is to be noted that the setting of the instantaneous tripping circuit 300 determines the upper limit or end of the range of overload currents to which the long time delay tripping circuit 200 responds, since when the highest instantaneous line current flowing in the conductors L1, L2 and L3 exceeds the predetermined or threshold value to which the instantaneous tripping circuit 300 responds, the trip coil 36 of the circuit breaker CB will be energized substantially instantaneously as determined by the operative characteristics of the instantaneous tripping circuit 300 without any intentional time delay being introduced prior to the energization of the trip coil 36. It is also important to note that the energization of the trip coil 36 in response to the long time delay tripping circuit and the instantaneous tripping circuit 300 occurs independently either after a predetermined time delay which varies substantially inversely with the square of the overcurrent in the case of the long time delay tripping circuit 200 or substantially instantaneously in response to the operation of the instantaneous tripping circuit 300. The operation of the instantaneous tripping circuit 300 may be inhibited or prevented in response to the closing of the main contacts BC1, BC2 and BC3 by the use of an auxiliary contact whose operation is coordinated with those of the main contacts of the circuit breaker CB and which is connected to the terminal 144 of the power supply input circuit 100 of the protective device shown in FIG. 1 and which, as shown in FIG. 2, is connected to the collector of the transistor Q18 of the instantaneous tripping circuit 300 as disclosed and claimed in copending application Ser. No. 765,552 filed by W. H. South and J. H. Taylor which is assigned to the same assignee as the present application.

Short Delay Tripping Circuit 500

Figure 3:
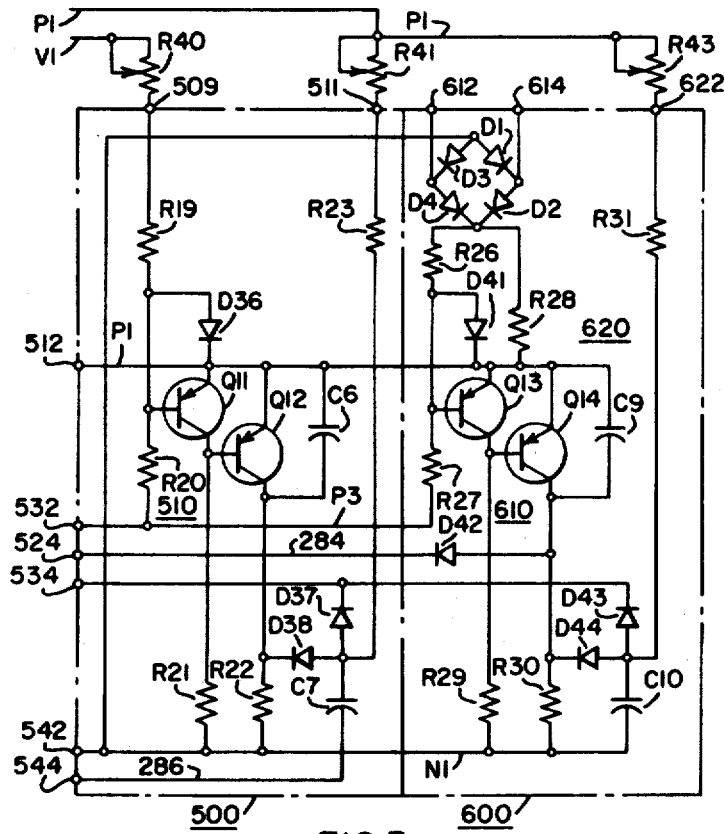
FIG. 3 is a detailed schematic diagram of an optional portion of the protective device which is shown in block form in FIG. 1.

Referring now to the short delay tripping circuit 500 which is indicated in block form in FIG. 1 and shown in detail in FIG. 3, the short delay tripping circuit 500 is connected between the first auctioneering circuit 110 and the output circuit 400 to respond to the highest instantaneous line current flowing in the conductors L1, L2 and L3 when the highest instantaneous line current succeeds substantially a predetermined or threshold value to actuate the output circuit 400 to energize the trip coil 36 following a substantially fixed or predetermined time delay which remains at the same predetermined value independently of the magnitude of the highest instantaneous current in excess of the predetermined value to which the short delay tripping circuit 500 responds. It is to be noted that the short delay tripping circuit 500 may be employed where required in combination with the long time delay tripping circuit 200 and the instantaneous tripping circuit 300 and that the short delay tripping circuit 500 independently actuates the output circuit 400 to energize the trip coil 36 with the predetermined current to which the short delay tripping circuit 500 responds being coordinated with the range of overload current to which the long time delay tripping circuit 200 responds and the predetermined instantaneous current to which the instantaneous tripping circuit 300 responds.

More specifically, the short delay tripping circuit 500 comprises a level detecting circuit 510 which includes the PNP transistors Q11 and Q12 and a voltage dividing network which controls the conducting state of a control means which comprises the diode D38 and which has a time delay reset operation of the same general type, as previously described in detail in connection with the level detecting circuit 260 of the long time delay tripping circuit 200. The voltage dividing network of the short delay tripping circuit 500 includes the resistors R19 and R20 along with the rheostat R40 which are connected in series with one another between the variable voltage output conductor V1 of the first auctioneering circuit 110 and the positive conductor P3. The base of the transistor Q11 is connected to the junction point between the resistors R19 and R20, while the emitter of the transistor Q11 is connected to the positive conductor P1. The diode D36 is connected between the base and the emitter of the transistor Q11 to protect the emitter-base circuit of the transistor Q11 from excessive reverse bias by limiting the maximum reverse voltage applied to the emitter-base circuit of the transistor Q11 to the forward voltage drop of the diode D36. The input voltage of the short delay tripping circuit 500 which is the sum of the voltage drops across the rheostat R40 and the resistor R19 is substantially equal to the highest unidirectional voltage across the resistors R1, R2 and R3 and, in turn, is directly proportional to the highest instantaneous line current flowing in the conductors L1, L2 and L3. The forward voltage drop in the emitter-base circuit of the transistor Q11 compensates the input voltage of the short delay tripping circuit 500 for the forward voltage drop across one of the diodes D17, D18 and D19 of the first auctioneering circuit 110. The collector of the transistor Q11 is directly connected to the base of the transistor Q12 and also to the common conductor N1 through the collector load resistor R21. The emitter of the transistor Q12 is directly connected to the positive conductor P1, while the collector of transistor Q12 is connected to the common conductor N1 through the collector load resistor R22 and through the diode D38 to the upper side of the timing capacitor C7 of the short delay tripping circuit 500. In order to delay the reset of the short delay gripping circuit 500 following the end of a period of time during which the highest instantaneous line current flowing in the conductors L1, L2 and L3 exceeds the predetermined or threshold value to which the short delay tripping circuit is adjusted to respond by the setting of the rheostat R40, the capacitor C6 is connected between the emitter and the collector of the transistor Q12 between the positive conductor P1 and the upper end of the resistor R22. In order to provide a substantially fixed or predetermined time delay between the start of an instantaneous overcurrent which exceeds the predetermined value and to which the short delay tripping circuit 500 is adjusted to respond, an R-C timing circuit is provided as part of the short delay tripping circuit 500 which includes the rheostat R41, the resistor R23 and the timing capacitor C7, with the rheostat R41 and the resistor R23 being connected in series with one another between the positive conductor P1 and the upper side of the timing capacitor C7. The upper side of the timing capacitor C7 is also connected to the emitter of the transistor Q15 which forms part of the output level detecting circuit 410 of the output circuit 400 through the normally reverse biased or blocked diode D37. The lower side of the timing capacitor C7 of the short delay tripping circuit 500 is connected by the conductor 286 to the output of the auxiliary pulse generating circuit 240 at the collector of the transistor Q3 which forms part of the auxiliary pulse generating circuit 240 in order that the lower side of the capacitor C7 be periodically raised in voltage with respect to the common conductor N1 to thereby periodically increase the effective voltage at the upper side of the capacitor C7.

In the operation of the short delay tripping circuit 500, it is important to note that the output of the first auctioneering circuit at the variable voltage conductor V1 which forms the input for the short delay tripping circuit 500 is unfiltered and therefore the input voltage of the short delay tripping circuit 500 which appears across the rheostat R40 and the resistor R19 comprises a series of unidirectional voltage pulses each having substantially the same configuration as one-half cycle of the alternating current which flows in the conductors L1, L2 and L3 similarly to the waveforms shown in FIG. 4A and described in detail in connection with the level detecting circuit 260 of the long time delay tripping circuit 200. In other words, the input of the short delay tripping circuit 500 at the variable voltage conductor V1 varies substantially instantaneously with the highest line current flowing in the conductors L1, L2 and L3.

As long as the highest instantaneous line current flowing in the conductors L1, L2 and L3 remains below substantially a predetermined or threshold value and the corresponding highest instantaneous unidirectional voltage across the resistors R1, R2 and R3 remains below a corresponding predetermined or threshold value, the transistor Q11 will be in a normally saturated condition since the emitter-base circuit of the transistor Q11 will be forward biased with the voltage at the conductor P1 with respect to the common conductor being greater than the voltage at the base of the transistor Q11 with respect to the common conductor N1. The predetermined highest instantaneous current to which the short delay tripping circuit 500 is adjusted to respond is determined by the setting of the rheostat R40. As long as the transistor Q11 is in a normally saturated condition, the emitter-base circuit of the transistor Q12 will be biased at substantially zero voltage and the transistor Q12 will be maintained in a substantially nonconducting or cutoff condition. When the transistor Q12 is in a substantially cutoff condition, the voltage drop across the resistor R22 due to the emitter-collector current of the transistor Q12 will be substantially negligible and the voltage at the cathode of the diode D38 which forms the control means of the short delay tripping circuit 500 will be relatively close to the voltage at the common conductor N1 with the diode D38 being forward biased to prevent the timing capacitor C7 from accumulating a charge from the positive conductor P1 through the rheostat R41 and the resistor R23. Since the cathode of the diode D37 is normally maintained at a positive voltage with respect to the common conductor N1 through the diode D45, the resistor R35, the diode D46 and the voltage at the positive conductor P3, the diode D37 and normally be reverse biased or blocked since the voltage at the anode of the diode D37 will be equal to the sum of the forward voltage drop of the diode D38 and the substantially negligible voltage drop across the resistor R22 as long as the highest instantaneous line current flowing in the conductors L1, L2 and and L3 remains below the predetermined or threshold value to which the short delay tripping circuit is adjusted to respond by the setting of the rheostat R40. It is to be noted that as long as the transistor Q12 is in a normally substantially nonconducting or cutoff condition, the capacitor C6 which is connected between the emitter and the collector of the transistor Q12 will be charged up to a voltage which is equal to the difference in voltage between the conductors P1 and N1 less a relatively low voltage drop across the resistor R22.

When the highest instantaneous current flowing in the conductors L1, L2 and L3 exceeds substantially a predetermined or threshold value to which the short delay tripping circuit 500 is adjusted to respond by the setting of the rheostat R40, the current which flows in the voltage dividing network which includes the rheostat R40, the resistor R19, and the resistor R20 will increase substantially instantaneously until the voltage at the base of the transistor Q11 increases in a positive direction to reverse bias the emitter-base circuit of the transistor Q11 which will then be actuated to a substantially nonconducting condition. When the transistor Q11 is actuated to substantially a nonconducting or cutoff condition, the current in the emitter-collector path of the transistor Q11 will decrease to a negligible value and the current which flows in the resistor R21 will now flow from the positive conductor P1 through the emitter-base circuit of the transistor Q12. The transistor Q12 will then be actuated to substantially a saturated condition. When the transistor Q12 is actuated to a substantially saturated condition, the current in the emitter-collector path of transistor Q12 will increase to thereby cause an increased voltage drop across the resistor R22 which will then reverse bias or block the diode D38 and permit the timing capacitor C7 to start charging from the positive conductor P1 through the rheostat R41 and the resistor R23. Assuming that the overcurrent condition to which the short delay tripping circuit is adjusted to respond continues for substantially a predetermined or fixed time delay as determined by the setting of the rheostat R41, the resistor R23 and the capacitor C7 which form a timing circuit which is charged from the regulated voltage between the conductors P1 and N1, the voltage at the upper side of the timing capacitor C7 which is periodically increased by the auxiliary voltage pulses from the auxiliary pulse generating circuit 240 which forms part of the long time delay tripping circuit 200 will be sufficient to forward bias the diode D37. When the diode D37 is forward biased, current will flow from the conductor P1 through the rheostat R41 and the resistor R23 to cause a base drive current to flow through the diode D37 into the emitter-base circuit of the transistor Q15 of the output level detecting circuit 410 to actuate the silicon controlled rectifier Q17 to a substantially conducting condition to thereby energize the trip coil 36 of the circuit breaker CB and to actuate the circuit breaker CB to an open condition, as previously explained in detail in connection with the long time delay tripping circuit.

It is to be noted that when the transistor Q12 is actuated to a substantially saturated condition in response to the highest instantaneous current which flows in the line conductors L1, L2 and L3, the capacitor C6 which forms a timing circuit with the resistor R22 will rapidly discharge through the emitter-collector path of the transistor Q12. If the highest instantaneous current flowing in the conductors L1, L2 and L3 exceeds the predetermined value to which the short delay tripping circuit 500 is adjusted to respond by the setting of the rheostat R40 and then instantaneously decreases below the predetermined value, the transistor Q11 will substantially instantaneously be returned to a saturated condition and the transistor Q12 will be substantially instantaneously restored to a substantially nonconducting condition. When the transistor Q12 is restored to a nonconducting condition, the capacitor C6 will then start to charge from the conductors P1 and N1 through the resistor R22. While the capacitors C6 is charging, the voltage across the resistor R22 will gradually decrease similarly to the voltage across the resistor R17 previously described in connection with the level detecting circuit 260 until the diode D38 is again forward biased to thereby rapidly discharge the timing capacitor C7, if the overall time delay provided by the short delay tripping conduit 500 has not been completed. In other words, after the operation of the short delay tripping circuit 500 is actuated by the highest instantaneous current flowing in the conductors L1, L2 and L3 and then the highest instantaneous current flowing in said conductors decreases below the predetermined value necessary to actuate the short delay tripping circuit 500 for a predetermined time period which is determined by the values of the capacitor C6 and the resistor R22 and the voltage between the conductors P1 and N1, the resetting of the short delay tripping circuit will be delayed for a predetermined time interval which may be slightly longer than one-half cycle of the alternating current flowing in the conductors L1, L2 and L3 similarly to the operation of the level detecting circuit 260 of the long time delay tripping circuit 200, as previously described in detail. On the other hand, if the highest instantaneous current flowing in the conductors L1, L2 and L3 exceeds substantially a predetermined or threshold value to which the short delay tripping circuit 500 is adjusted to respond by the setting of the rheostat R40 and then decreases for a period of time less than the time delay provided in the reset short delay tripping circuit 500, the timing out or accumulation of charge on the timing capacitor C7 will continue in an uninterrupted fashion. It is to be noted that the substantially predetermined or fixed time delay provided in the overall operation of the short delay tripping circuit 500 which is determined by the timing circuit which includes the resistor R23, the rheostat and the timing capacitor C7 is substantially independent of the magnitude of the highest instantaneous line current in the conductors L1, L2 and L3 for values of instantaneous line current in excess of the predetermined value to which the short delay tripping circuit 500 is adjusted to respond by the setting of the rheostat R40 and that the time delay provided in the operation of the short delay tripping circuit 500 may be adjusted or varied by the setting of the rheostat R41.

Where provided, the short delay tripping circuit 500 determined by the predetermined instantaneous overcurrent to which it is adjusted to respond by the setting of the rheostat R40, the upper limit of the range of overcurrents to which the long time delay tripping circuit 200 will respond in a particular application since if the highest instantaneous line current flowing in the conductors L1, L2 and L3 exceeds the predetermined value to which the short delay tripping circuit is adjusted to respond by the setting of the rheostat R40, the output circuit 400 will be actuated to energize the trip coil 36 after substantially a predetermined or fixed time delay independent of the value of the highest instantaneous overcurrent in excess of the instantaneous overcurrent to which the short delay tripping circuit 500 is adjusted to respond which is normally shorter in duration than the minimum time delay provided in the operation of the long time delay tripping circuit 200. It is to be noted that the reset of the short delay tripping circuit 500 is accomplished by the discharge of the capacitor C7 through the diode D38 and the resistor R22 to the common conductor N1 rather than employing a control means of the emitter follower type such as the control means 270 which forms part of the level detecting circuit 260 of the long time delay tripping circuit 200 since the timing capacitor C7 is normally of a lower value than the timing capacitor C4 which forms part of the long time delay tripping circuit 200. In summary, it is important to note that the short delay tripping circuit 500 where provided is arranged to independently actuate the output circuit 400 along with the long time delay tripping circuit 200 and the instantaneous tripping circuit 300 where provided.

Ground Current Tripping Circuit 600

Referring now to the ground current tripping circuit 600 which is indicated in block form in FIG. 1 and which is shown in detail in FIG. 3, the ground current tripping circuit 600, in general, is connected between the ground current transformer T4 and the output circuit 400 to actuate the output circuit 400 to energize the trip coil 36 of the circuit breaker CB when the magnitude of the ground current as sensed by the transformer T4 exceeds substantially a predetermined or threshold value. More specifically, the primary winding of the ground current transformer T4 is connected between the neutral conductor NT1 of the current transformers CT1, CT2 and CT3 and the neutral conductor NT2 of the interposing transformers T1, T2 and T3. The terminal 42 at the upper end of the primary winding of the transformer T4 may be connected to the ground conductor (not shown) of the electrical system which includes the conductors L1, L2 and L3 and which is provided with ground current protection where desired in a particular application. The output ground current of the transformer T4 which is available at the conductors G12 and G13 is applied at the input terminals 612 and 614, respectively, of a full wave bridge type rectifier circuit which includes the diodes D1, D2, D3 and D4 to obtain a unidirectional current output which is directly proportional to and varies in a substantially linear manner with the ground current in the electrical system being protected. The positive output terminal of the full-wave bridge-type rectifier which includes the diodes D1 through D4 is connected to the positive conductor P1 through the resistor R28 to develop a unidirectional voltage across the resistor R28 which is directly proportional to and varies in a substantially linear manner with the ground current in the electrical system being protected. The negative output terminal of the full-wave bridge-type rectifier which includes the diodes D1 through D4 is connected to the common or negative conductor N1.

More specifically, the ground current tripping circuit 600 includes a level detecting circuit 610 and a time delay circuit 620 which provides a substantially predetermined or fixed time delay between the time the ground current exceeds substantially a predetermined or threshold value and the time that the trip coil 36 is energized through the output circuit 400. The level detecting circuit 610 of the ground current tripping circuit 600 includes a time delay reset operation similar to that of the level detecting circuit 260 of the long time delay tripping circuit 200 and the level detecting circuit 510 of the short delay tripping circuit 500, as just described. In particular, the input of the level detecting circuit 610 comprises the voltage dividing network which includes the resistors R26 and R27 which are connected in series with one another between the positive output terminal of the full-wave bridge-type rectifier which includes the diodes D1 through D4 and the positive conductor P3. The level detecting circuit 610 also includes the PNP transistors Q13 and Q14. The base of the transistor Q13 is connected to the junction point between the resistors R26 and R27, while the emitter of the transistor Q13 is connected to the positive conductor P1. In order to protect the emitter-base circuit of the transistor Q13 from excessive reverse bias by limiting the reverse emitter-base voltage, the diode D41 is connected between the base and the emitter of the transistor Q13 to limit the voltage between the emitter and the base of the transistor Q13 to the forward voltage drop of the diode D41. The collector of the transistor Q13 is connected to the common conductor N1 through the collector load resistor R29 and also to the base of the transistor Q14. The emitter of the transistor Q14 is connected to the positive conductor P1, while the collector of the transistor Q14 is connected to the common conductor N1 through the collector load resistor R30. The collector of the transistor Q14 is also connected to the upper side of the timing capacitor C10 through the normally forward biased diode D44. In order to delay the reset of the ground current tripping circuit after the ground current exceeds substantially a predetermined or threshold value and then decreases below the predetermined or threshold value before the time delay provided in the operation of the ground current tripping circuit 600 by the timing circuit 620 is completed, the capacitor C9 is connected between the emitter and the collector of the transistor Q14.

The time delay circuit 620 of the ground current tripping circuit 600 comprises the rheostat R43 and the resistor R31 which are connected in series with one another between the positive conductor P1 and the upper side of the timing capacitor C10, which is connected in series with the rheostat R43 and a resistor R31 between the positive conductor P1 and the common conductor N1. The upper side of the timing capacitor C10 is also connected to the emitter of the transistor Q15 which forms part of the output level detecting circuit 410 through the normally reverse biased or blocked isolating diode D43. It is to be noted that the ground current tripping circuit 600 is of the type which is disclosed and claimed in copending application Ser. No. 765,583, filed concurrently by J. D. Watson and which is assigned to the same assignee as the present application.

In order to prevent the control means 270 which comprises the transistor Q10 and which forms part of the level detecting circuit 260 of the long time delay tripping circuit 200 from forming a low resistance path between the cathode of the diode D43 and the common conductor N1 during the operation of the ground current tripping circuit 600 which would otherwise prevent the ground current tripping circuit 600 from actuating the operation of the output circuit 400, the diode D42 is connected between the collector of the transistor Q14 and the base of the transistor Q10, as will be explained hereinafter.

In the operation of the ground current tripping circuit 600, as long as the ground current in the electrical system being protected remains below substantially a predetermined or threshold value as sensed by the transformer T4, the emitter-base circuit of the transistor Q13 will be forward biased since the voltage at the emitter of the transistor Q13 which is the same as the regulated voltage at the positive conductor P1 will be greater than the voltage at the base of the transistor Q13 which is equal to the voltage at the positive conductor P3 plus a voltage drop across the resistor R27. As long as the transistor Q13 is in a substantially saturated condition due to the forward biasing of its emitter-base circuit, the emitter-collector current of the transistor Q13 will produce a voltage drop across the resistor R29 which results in a substantially zero voltage bias of the base-emitter junction of the transistor Q14 and the transistor Q14 which will be maintained in a normally substantially cutoff or nonconducting condition. As long as the transistor Q14 is substantially nonconducting or cutoff, the voltage drop across the resistor R30 will be substantially negligible or at a relatively low value and the diode D44 will be forward biased due to the voltage at the positive conductor P1 which is applied to the anode of the diode D44 through the rheostat R43 and the resistor R31. As long as the diode D44 which comprises a control means whose conduction is controlled by the operation of the ground current tripping circuit 600 is forward biased and in a substantially conducting condition, the timing capacitor C10 will not be permitted to accumulate a charge from the positive conductor P1 through the rheostat R43 and the resistor R31 since the current flow from the conductor P1 through the rheostat R43 and the resistor R31 will be diverted away from the capacitor C10 to the common conductor N1 through the diode D44 and the resistor R30. It is to be noted that as long as the transistor Q14 remains in a substantially nonconducting condition, the capacitor C9 will charge up to a voltage which is equal to the voltage difference between the conductors P1 and N1 less the relatively low voltage drop across the resistor R30. It is also to be noted that as long as the diode D44 remains forward biased, the voltage at the upper side of the capacitor C10 will be equal to the sum of the forward voltage drop of the diode D44 and the voltage drop across the resistor R30 which is relatively low, so that the diode D43 will be reverse biased or blocked since the voltage at the emitter of the transistor Q15 is maintained at a positive voltage with respect to the common conductor N1 by the diode D46, the resistor R35 and the diode D45 which are connected in series between the emitter of the transistor Q15 and the positive conductor P3.

In the operation of the ground current tripping circuit 600 when the ground current in the electrical system being protected exceeds substantially a predetermined or threshold value to which said circuit responds and the corresponding unidirectional voltage across the resistor R28 exceeds substantially a predetermined or threshold value, the voltage at the base of the transistor Q13 will increase sufficiently in a positive direction to reverse bias the emitter-base circuit of the transistor Q13 which will then be actuated to a substantially nonconducting or cutoff condition. When the transistor Q13 is actuated to a substantially nonconducting condition, the current in the emitter-collector path of the transistor Q13 will decrease to a negligible value and the current which flows in the resistor R29 will now flow from the positive conductor P1 through the emitter-base circuit of the transistor Q14. The transistor Q14 will then be actuated to a substantially saturated condition. When the transistor Q14 is actuated to a substantially saturated condition, the emitter-collector current of the transistor Q14 will increase to thereby increase the voltage drop across the resistor R30 and to reverse bias or block the diode D44 which will then permit the timing capacitor C10 to start accumulating a charge from the positive conductor P1 through the rheostat R43 and the resistor R31. If permitted to do so by the continuing of the ground current to exceed the predetermined or threshold value, the voltage across the timing capacitor C10 will gradually increase after a predetermined time delay to a value which is sufficient to forward bias the diode D43. It is to be noted that since the charging of the capacitor C10 is from the regulated voltage at the conductor P1 through the rheostat R43 and the resistor R31, the time delay provided by the time delay circuit 620 will be substantially a predetermined or fixed value after the charging of the capacitor C10 is started by the operation of the level detecting circuit 610 as just described. When the diode D43 is forward biased by the voltage across the timing capacitor C10, a current will flow from the positive conductor P1 through the rheostat R43, the resistor R31 and the diode D43 to the emitter of the transistor Q15 which forms part of the output level detecting circuit 410 of the output circuit 400 which will then be actuated to energize the trip coil 36 of the circuit breaker CB and to actuate said circuit breaker to an open condition, as previously described in detail in connection with the long time delay tripping circuit 200.

If the ground current exceeds the predetermined or threshold value necessary to actuate the transistor Q14 to a substantially saturated condition as just described, the capacitor C9 which is connected between the emitter and the collector of the transistor Q14 will be rapidly discharged through the emitter-collector path of the transistor Q14. If the ground current exceeds the predetermined or threshold value necessary to actuate the transistor Q14 to substantially a saturated position and then instantaneously decreases below the predetermined or threshold value, the capacitor C9 will gradually charge through the resistor R30 until the voltage at the cathode of the diode D44 decreases due to the decreasing voltage drop across the resistor R30 sufficiently to forward bias the diode D44 to thereby rapidly discharge or reset the timing capacitor C10 if the voltage across the capacitor C10 has not yet reached the value necessary to forward bias the diode D43. The time delay in the resetting of the ground current tripping circuit 600 following the end of a ground current which exceeded the predetermined value to which the level detecting circuit 610 responds to thereby actuate the operation of the level detecting circuit 610 is for a time period which may be slightly longer than one-half cycle of the alternating current which flows in the conductors L1, L2 and L3 and is determined by the values of the capacitor C9 and the resistor R30 and the voltage between the conductors P1 and N1. In other words, if the ground current in the circuit being protected exceeds the predetermined or threshold value and then continues without an interruption longer than the resetting time delay of the level detecting circuit 610, the charging of the capacitor C10 will continue in an uninterrupted manner until the fixed time delay of the ground current tripping circuit 600, as determined by the time delay circuit 620, is completed. It is to be noted that the predetermined time delay provided by the time delay circuit 620 of the ground current tripping circuit 600 may be varied between minimum and maximum values by the adjustment or setting of the rheostat R43 which forms part of the time delay circuit 620.

As previously mentioned, it is to be noted that in the operation of the ground current tripping circuit 600, each time that the transistor Q14 is actuated from a substantially nonconducting condition to substantially a saturated condition in response to a predetermined ground current occuring in the electrical system being protected, the voltage drop across the resistor R30 which increases with increased current flow in the emitter-collector path of the transistor Q14 results in a higher positive voltage at the anode of the diode D42 with respect to the conductor N1 which is transmitted to the base of the transistor Q10 through the diode D42 and which reverse biases the emitter-base circuit of the transistor Q10 and actuates the transistor Q10 to a substantially nonconducting or cutoff condition. This operation prevents the control means 270 which comprises the transistor Q10 form forming a low resistance path to the common conductor N1 which would otherwise divert the output current from the ground current tripping circuit 600 away from the emitter of the transistor Q15 which is connected to the emitter of the transistor Q10 through the diode D35 to thereby prevent the ground current tripping circuit 600 from actuating the operation of the output circuit 400. This circuit arrangement is necessary since the level detecting circuit 260 of the long time delay tripping circuit 200 may not actuate the control means 270 which comprises the transistor Q10 to a substantially nonconducting condition even through the ground current in the electrical system which includes the conductors L1, L2 and L3 may have reached a predetermined ground current flow which is sufficient to actuate the operation of the ground current tripping circuit 600 where provided. It is to be noted that the control means 270 which comprises the transistor Q10 would necessarily be actuated to a substantially nonconducting condition prior to the operation of either the instantaneous gripping circuit 300 or the short delay tripping circuit 500 where provided since the predetermined current to which the instantaneous tripping circuit 300 responds with the predetermined current to which the short delay tripping circuit 500 responds is greater than and determines the upper limit of the range of overload currents to which the long time delay tripping circuit 200 responds.

It is important to note that the level detecting circuit 260 of the long time delay tripping circuit 200, the level detecting circuit or means 510 of the short delay tripping circuit 500 and the level detecting circuit 610 of the ground current tripping circuit 600 as just described are all of the same type which was described in greater detail in connection with the long time delay tripping circuit in that each of said level detecting circuits includes a reset operation of the time delay type in order to provide a relatively fast resetting operation in each of said level detecting circuits or means.

The circuits and apparatus embodying the teachings of this invention have several advantages. For example, a static overcurrent protective device of the time delay type is provided which includes a level detecting means which is responsive substantially instantaneously to the current in an alternating current electrical circuit to initiate the start of whatever time delay is provided in the operation of the overall protective device whenever the alternating current to the circuit being protected exceeds substantially a predetermined or threshold value and yet which resets relatively rapidly when the alternating current decreases below the predetermined or threshold value for a time period which may be slightly longer than one-half cycle of the alternating current. More specifically, the level detecting means of the overcurrent protective device is disclosed responds to a rectified, unfiltered signal which is directly proportional to the alternating current in the circuit being protected to produce an output which continues in an uninterrupted fashion as long as the instantaneous interruptions in the alternating current below the predetermined or threshold value are less than time delay provided in the resetting of the level detecting circuit. In other words, the level detecting circuit as disclosed provides an uninterrupted output without chopping as long as the time periods during which the instantaneous alternating current to which the circuit responds decreases below the predetermined or threshold value is less than a relatively short time interval determined by a timing circuit included as part of the level detecting circuit delays the reset of the level detecting circuit. Finally, the level detecting circuit as disclosed provides substantially instantaneous response to initiate the start of whatever time delay is provided in the operation of the overall protective device and relatively fast resetting operation in a relatively simple manner compared with other circuits of the same general type which have been proposed in the past and accomplished the same general purposes. It is to be noted that a level detecting circuit as disclosed is broadly applicable as a level sensing means for any protective device having an input of the alternating current type.

It is to be noted that an overcurrent protective device is disclosed including a level detecting means may be employed with a polyphase alternating circuit to respond only to the highest of the line currents in the polyphase circuit or may be employed with a single-phase alternating current circuit to respond to a single line current where desired in the particular application.

Since numerous changes may be made in the above described circuit and apparatus and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. An overcurrent protective device comprising first means adapted to be connected to an alternating current circuit for deriving therefrom unidirectional output voltage pulses having substantially the same configuration as the half wave portions of the alternating current in said circuit and a magnitude which is substantially directly proportional to that of the current in said circuit, level detecting means connected to said first means for producing a first output substantially instantaneously when the magnitude of said output pulses exceeds substantially a predetermined value, second means adapted to be connected to said alternating current circuit and to said level detecting means for producing a second output after a predetermined time delay which is actuated to start and to continue by said first output, said level detecting means including a timing circuit for maintaining said first output for a predetermined time interval when the magnitude of said output pulses decreases below said predetermined value after exceeding said predetermined value.

2. The device as claimed in claim 1 wherein said predetermined time interval is slightly longer than one-half cycle of the alternating current in said alternating current circuit.

3. The device as claimed in claim 1 wherein said level detecting means includes a control means connected to said second means for normally preventing said second means from producing said second output until said level detecting means produces said first output to start said predetermined time delay and continues said first output until the end of said predetermined time delay.

4. An overcurrent protective device comprising first means adapted to be connected to an alternating current circuit for deriving therefrom unidirectional output voltage pulses having substantially the same configuration as the half-wave portions of the alternating current in said circuit and a magnitude which is substantially proportional to that of the current in said circuit, a capacitor for accumulating a charge, second means connected between said circuit and said capacitor for charging said capacitor, level detecting means connected between said first means and said capacitor to be responsive to the magnitude of said output pulses and including control means for normally preventing said second means from charging said capacitor until the magnitude of said output pulses exceeds substantially a predetermined value, third means connected to said capacitor for producing an output when the charge on said capacitor increases to a predetermined level after a predetermined time delay which is initiated by said level detecting means when the magnitude of said output pulses exceeds substantially said predetermined value, said level detecting means including a timing circuit connected to said control means for actuating said control means to permit said capacitor to continue charging for a predetermined time interval when the magnitude of said output pulses decreases below said predetermined value after exceeding said predetermined value.

5. The device as claimed in claim 4 wherein said time interval is slightly longer than one-half cycle of the alternating current in said alternating current circuit.

6. The device as claimed in claim 4 wherein an additional means is connected to said first means and to said third means for independently actuating said third means to produce an output substantially instantaneously when the magnitude of said output pulse exceeds substantially a predetermined value which is relatively larger than the predetermined value to which said level detecting means responds to initiate said predetermined time delay.

7. The device as claimed in claim 4 wherein said timing circuit comprises a resistor and a capacitor connected to a source of unidirectional voltage and to said control means to maintain said control means substantially nonconducting for said predetermined time interval when the magnitude of said output pulses decreases below said predetermined value after exceeding said predetermined value.

8. A polyphase overcurrent protective device comprising first means adapted to be connected to all three phases of a three-phase alternating circuit for deriving therefrom unidirectional output voltage pulses having substantially the same configuration as the half-wave portions of the alternating current in said circuit and a magnitude which is substantially directly proportional only to the highest of the three-phase currents in said circuit, level detecting means responsive to the magnitude of said output pulses for producing a first output substantially instantaneously when the magnitude of said output pulses exceeds substantially a predetermined value, second means adapted to be connected to said circuit and to said level detecting means for producing a second output after a predetermined time delay which is actuated to start and to continue by said first output, said level detecting means including a timing circuit for maintaining said first output for a predetermined time interval when the magnitude of said output pulses decreases below said predetermined value after exceeding said predetermined value.

9. The device as claimed in claim 8 wherein said predetermined time interval is slightly larger than one-half cycle of the alternating current in said alternating current circuit.

10. The device as claimed in claim 9 wherein an additional means is connected to said first means and to said second means for independently actuating said second means to produce said second output substantially instantaneously when the magnitude of said output pulses exceeds substantially a second predetermined value which is relatively larger than the predetermined value to which said level detecting means responds to produce said first output.

11. A circuit breaker for use with an alternating current circuit comprising separable contacts adapted to be connected to said circuit, operating means for opening said contacts, and an overcurrent protective device operatively connected to said operating means and responsive to the current in said circuit for producing an output to actuate said operating means to open said contacts, said protective device comprising first means adapted to be connected to said circuit for deriving therefrom unidirectional output voltage pulses having substantially the same configuration as the half-wave portions of the alternating current in said circuit and a magnitude which is substantially directly portional to that of the current in said circuit, level detecting means connected to said first means for producing a first output substantially instantaneously when the magnitude of said output pulses exceeds substantially a predetermined value, second means adapted to be connected to said circuit and to said level detecting means for producing a second output after a predetermined time delay which is actuated to start and to continue by said first output, said level detecting circuit including a timing circuit for maintaining said first output for a predetermined time interval when the magnitude of said output pulses decreases below said predetermined value after exceeding said predetermined value, and third means operatively connected between said second means and said operating means for producing an additional output in response to said second output to actuate said operating means to open said contacts.

12. The circuit breaker as claimed in claim 11 wherein said predetermined time interval is slightly longer than one-half cycle of the alternating current in said circuit.

13. The circuit breaker as claimed in claim 11 wherein said level detecting means includes a control means connected to said second means for normally preventing said second means from producing said second output until said level detecting means produces said first output to start said predetermined time delay and continues said first output until the end of said predetermined time delay.

14. A circuit breaker for use with an alternating current circuit comprising separable contacts adapted to be connected to said circuit, operating means for opening said contacts, and an overcurrent protective device operatively connected to said operating means and responsive to the current in said circuit for producing an output to actuate said operating mean to open said contacts, said protective device comprising first means adapted to be connected to said circuit for deriving therefrom unidirectional output voltage pulses having substantially the same configuration as the half-wave portions of the alternating current in said circuit and a magnitude which is substantially proportional to that of the current in said circuit, a capacitor for accumulating charge, second means connected between said circuit and said capacitor for charging said capacitor, level detecting means connected between said first means and said capacitor to be responsive to the magnitude of said output pulses and including control means for normally preventing said second means from charging said capacitor until the magnitude of said output pulses exceeds substantially a predetermined value, and third means operatively connected between said capacitor and aid operating means for producing an output when the charge on said capacitor increases to a predetermined level after a predetermined time delay which is initiated by said level detecting means when the magnitude of said output pulses exceeds substantially said predetermined value to thereby actuate said operating means to open said contacts, said level detecting means including a timing circuit connected to said control means for actuating said control means to permit said capacitor to continue charging for a predetermined time interval when the magnitude of said output pulses decreases below said predetermined value after exceeding said predetermined value.

15. The circuit breaker as claimed in claim 14 wherein said time interval is slightly longer than one-half cycle of the alternating current in said circuit.

16. The combination as claimed in claim 14 wherein an additional means is connected to said first means and to said third means for independently actuating said third means to produce an output substantially instantaneously when the magnitude of said output pulses exceeds substantially a predetermined value which is relatively larger than the predetermined value to which said level detecting means responds to initiate said predetermined time delay.

17. The circuit breaker as claimed in claim 14 wherein said timing circuit comprising a resistor and a capacitor connected to a source of unidirectional voltage and to said control means to maintain said control means substantially nonconducting for said predetermined time interval when the magnitude of said output pulses decreases below said predetermined value after exceeding said predetermined value to thereby permit said capacitor to continue charging during said predetermined time interval.

18. A circuit breaker for use with a three-phase alternating current circuit comprising three sets of separable contacts adapted to be connected to said circuits, operating means for opening said sets of contacts, and an overcurrent protective device operatively connected to said operating means and responsive to the currents in said circuit for producing an output to actuate said operating means to open said sets of contacts, said protective device comprising first means adapted to be connected to said circuit for deriving therefrom unidirectional output voltage pulses having substantially the same configuration as the half-wave portions of the alternating current in said circuit and a magnitude which is substantially proportional to that of the highest of the three-phase currents in said circuit, level detecting means responsive to the magnitude of said output pulses for producing a first output substantially instantaneously when the magnitude of said output pulse exceeds substantially a predetermined value, second means adapted to be connected to said circuit and to said level detecting means for producing a second output after a predetermined time delay which is actuated to start and to continue by said first output, said level detecting means including a timing circuit for maintaining said first output for a predetermined time interval when the magnitude of said output pulses decreases below said predetermined value after exceeding said predetermined value, and third means operatively connected between said second means and said operating means for producing an additional output in response to said second output to actuate said operating means to open said three sets of contacts.

19. The circuit breaker as claimed in claim 18 wherein said predetermined time interval is slightly longer than one-half cycle of the alternating current in said alternating current circuit.

20. The circuit breaker as claimed in claim 18 wherein an additional means is connected to said first means and to said third means for independently actuating said third means to produce said additional output substantially instantaneously when the magnitude of said output pulses exceeds substantially a second predetermined value which is relatively larger than the predetermined value to which said level detecting means responds to produce said first output.